United States Patent
Huang

(10) Patent No.: US 7,231,109 B1
(45) Date of Patent: Jun. 12, 2007

(54) ULTRAFAST OPTICAL COMMUNICATIONS SYSTEM WITH MULTIPLEXER AND DEMULTIPLEXER

(76) Inventor: Alan Huang, 682 Sixteenth Ave., Menlo Park, CA (US) 94025

(*) Notice: Subject to any disclaimer, the term of this patent is extended or adjusted under 35 U.S.C. 154(b) by 0 days.

(21) Appl. No.: 11/420,762

(22) Filed: May 28, 2006

(51) Int. Cl.
G02B 6/28 (2006.01)

(52) U.S. Cl. .......................... 385/24; 385/16; 398/79; 398/82; 398/102

(58) Field of Classification Search ............ 385/16–24, 385/140; 398/43, 45, 46–48, 53, 68, 75, 398/79, 82, 102
See application file for complete search history.

(56) References Cited

U.S. PATENT DOCUMENTS

| | | | |
|---|---|---|---|
| 5,144,375 A | | 9/1992 | Gabriel et al. |
| 5,146,517 A | | 9/1992 | Avramopoulos et al. |
| 5,329,393 A | | 7/1994 | Huang |
| 6,657,773 B2 | * | 12/2003 | Chiaroni et al. ............ 359/326 |
| 7,095,959 B2 | * | 8/2006 | LoCascio et al. ........... 398/102 |

OTHER PUBLICATIONS

"All-optical arbitrary demultiplexing at 2.5 Gb/s with tolerance to timing jitter," by N. Whitaker, et al., Optical Letters, vol. 16, pp. 1838-1840, 1991.

"1.28 Tbit/s-70 km OTDM transmission using third- and fourth-order simultaneous dispersion compensation with a phase modulator," M. Nakazawa, et al., Electronics Letters, vol. 36, issue 24, p. 2027-2029, Now 23, 2000.

"Sagnac fiber logic gates and their possible applications: a system perspective," by A. Huang, et al., Applied Optics, vol. 33, No. 26, pp. 6254-6267, Sep. 10, 1994.

* cited by examiner

*Primary Examiner*—Hemang Sanghavi

(57) ABSTRACT

The electronic-to-optical multiplexer takes n electronic inputs $X_i$ where $i=0$ to $n-1$; converts $X_i$ into optical signals $Y_i$ each with a different wavelength; wavelength multiplexes $Y_i$; samples $Y_i$ with an optical frame sync signal having a period of $n*p$ seconds and a pulse width w; wavelength demultiplexes $Y_i$; staggers $Y_i$ by $i*p$ seconds; wavelength multiplexes $Y_i$; gates an optical clock signal with $Y_i$; and uses the gated optical clock signal as the optical output.

The optical-to-electronic demultiplexer takes n optical sources $Z_i$ each with a different wavelength; wavelength multiplexes $Z_i$; gates $Z_i$ with the input of the optical-to-electronic demultiplexer; wavelength demultiplexes $Z_i$; staggers $Z_i$ by $(n-i)*p$ seconds; wavelength multiplexes $Z_i$; gates $Z_i$ with the frame sync signal delayed by $(n-1)*p$ seconds; wavelength demultiplexes $Z_i$; detects $Z_i$ with detectors $DECT_i$; and uses the output of $DECT_i$ as the electronic outputs.

20 Claims, 26 Drawing Sheets

ULTRAFAST OPTICAL COMMUNICATIONS SYSTEM WITH MULTIPLEXER AND DEMULTIPLEXER

BACKGROUND OF THE INVENTION

1. Field of Invention

This invention is an ultrafast optical time division multiplexed optical communication system comprising an ultrafast electronic-to-optical multiplexer and an ultrafast optical-to-electronic demultiplexer.

2. Prior Art

A common problem with ultrafast optical communication systems is how to multiplex electronic rate signals up to optical rates and demultiplex the optical rate signals down to electronic rates.

One approach to implementing an electronic-to-optical multiplexer, as shown in FIG. 1 (prior art) converts electronic signals into optical signals and then uses optical switches to select the optical signal. One problem with this approach is that it takes n optical switches to multiplex n electronic signals.

One approach to implementing an optical-to-electronic demultiplexer as shown in FIG. 1 (prior art) uses optical switches to select a time slice of the time division multiplexed optical signal. The selected time slice is then detected and converted into an electronic signal. One problem with this approach is that it takes n optical switches to demultiplex n electronic signals.

One optical switch that has been used for multiplexing and demultiplexing is the Sagnac switch, also referred to as a nonlinear optical loop mirror (NOLM). This optical switch is discussed in the article, "All-optical arbitrary demultiplexing at 2.5 Gb/s with tolerance to timing jitter," by N. Whitaker, et al., Optical Letters, vol. 16, pp. 1838-1840, 1991. Over the years, the multiplexing and demultiplexing rate has been pushed upwards. This advance is illustrated by the article, "1.28 Tbit/s-70 km OTDM transmission using third- and fourth-order simultaneous dispersion compensation with a phase modulator," M. Nakazawa, et al., Electronics Letters, vol. 36, issue 24, p. 2027-2029, Nov. 23, 2000.

The Sagnac switch is discussed in more detail in "Low distortion all-optical threshold device," H. Avramopoulos, et al., U.S. Pat. No. 5,146,517, Sep. 8, 1992; "Sagnac optical logic gate," M. C. Gabriel, et al., U.S. Pat. No. 5,144,375, Sep. 1, 1992; in the background discussion of "Optical State Machines," U.S. patent application 11380768; and in "Sagnac fiber logic gates and their possible applications: a system perspective," by A. Huang, et al., Applied Optics, vol. 33, no. 26, pp. 6254-6267, Sep. 10, 1994.

Briefly, there are two versions of the Sagnac logic gate. One is based on polarization while the other is based on wavelength. The polarization based Sagnac logic gate is shown in FIG. 2 (prior art). The polarization based Sagnac switch comprises a 50/50 polarization maintaining splitter 11 with a first and second end each with a first and second bi-directional port each with a fast and slow axis of polarization; an "input" polarization selective coupler 13 with a first and second end each with a first and second bi-directional port each with a fast and slow axis of polarization; a loop of polarization maintaining fiber 14 with a first and second end each with a fast and slow axis of polarization; a "dump" polarization selective coupler 12 with a first and second end each with a first and second bi-directional port each with a fast and slow axis of polarization; a clockwise polarization maintaining optical circulator 10 with three bi-directional ports each with a fast and slow axis of polarization; a delay 15 with an first and second end each with a fast and a slow axis of polarization; and a delay 16 with a first and second end each with a fast and a slow axis of polarization.

The slow axis of polarization output of the second (clockwise) port of optical circulator 10 is connected to the slow axis of polarization of the first port of the first end of 50/50 polarization maintaining splitter 11. The slow axis of polarization of the first output of the second end of splitter 11 is connected to the slow axis of polarization first port of the first end of the "dump" polarization selective coupler 12. The slow axis of polarization of the first port of the second end of polarization selective coupler 12 is connected to the slow axis of polarization of the first end of the loop of polarization maintaining fiber 14. The slow axis of polarization of the second end of the loop of fiber 14 is connected to the slow axis of polarization of the first port of the second end of the "input" polarization selective coupler 13. The slow axis of polarization of the first port of the first end of the input polarization selective coupler 13 is connected to the second port of the second end of 50/50 polarization maintaining splitter 11.

Input A is connected to the slow axis of polarization of the first port of optical circulator 10. Output X is connected to the slow axis of polarization of the second port of the first end of 50/50 polarization maintaining splitter 11. Input B is connected to the fast axis of polarization of the second port of the first end of "input" polarization selective coupler 13. Output C is connected to the fast axis of polarization of the first port of the first end of the "dump" polarization selective coupler 12. Output Y is connected to the slow axis of polarization of the output of the third (clockwise) port of optical circulator 10.

The length of the optical fiber 14 is selected such that input B signal on the fast axis of polarization has enough time to completely pass through input A signal on the slow axis of polarization.

In the un-switched mode of operation, a first signal with a slow axis of polarization is fed to input A. Input A is connected via circulator 10 to splitter 11. Splitter 11 splits the signal into a clockwise and counter clockwise portion. The clockwise portion passes via "input" coupler 13, fiber loop 14, and "dump" coupler 12 to splitter 11. Splitter 11 splits the clockwise signal into two portions. One portion emerges at the first port of the first end of splitter 11; while the other portion emerges at the second port of the first end of splitter 11. The counter clockwise portion passes via "dump" coupler 12, fiber loop 14, and "input" coupler 13 to splitter 11. Splitter 11 splits the counter clockwise signal into two portions. One portion emerges at the first port of the first end of splitter 11, while the other portion emerges at the second port of the first end of splitter 11. The clockwise and counter clockwise portions of the input signal constructively interfere and reconstruct the input A signal at the first port of the first end of splitter 11. As a result, a reconstructed version of the input A signal emerges from output Y, sometimes called the normally connected output, via circulator 10. The clockwise and counter clockwise portions of the input A signal destructively interfere at the second port of the first end of splitter 11. As a result, no signal emerges from output X, sometimes called the normally open output. The un-switched mode of operation is commonly called the "mirror" mode, since the input signal fed to first port of the first end of splitter 11 emerges at same port and the Sagnac switch appears to act like a mirror.

In the switched mode of operation, a first input signal with a slow axis of polarization is fed to input A. Input A is connected via optical circulator 10 to splitter 11. Splitter 11 splits the input A signal into a clockwise and counter clockwise portion. The clockwise portion passes via the slow axis of propagation of "input" coupler 13, polarization maintaining fiber loop 14, and "dump" coupler 12 to splitter 11. Splitter 11 splits the clockwise signal into two portions. One portion emerges at the first port of the first end of splitter 11, while the other portion emerges at the second port of the first end of splitter 11. The counter clockwise portion passes via the slow axis of propagation of "dump" coupler 12, fiber loop 14, and "input" coupler 13, to splitter 11. Splitter 11 splits the counter clockwise signal into two portions. One portion emerges at the first port of the first end of splitter 11, while the other portion emerges at the second port of the first end of splitter 11. Meanwhile, a second input signal with a fast axis of polarization is fed to input B and passes via the fast axis of polarization of "input" coupler 13, fiber loop 14, and "dump" coupler 12 to output C. The input B signal co-propagates with the clockwise portion of the input A signal and counter-propagates with the counter clockwise portion of the input B signal. The ultrafast, nonlinear, all-optical Kerr effect shifts the phase of the clockwise portion of the input A signal relative to the counter clockwise portion of the input A signal. The amount of this phase shift is determined by the intensity of the input B signal and the amount of time the co-propagating clockwise input A signal and input B signal temporally overlap. The overlap time depends on the length of the loop and the difference in the index of refraction of the slow and fast axis of polarization of the couplers and fiber loop. The intensity of the input B signal and the physical parameters of the Sagnac switch are selected such that the input B signal induces a $\pi$ or a 180 degree phase shift between the clockwise and counter clockwise portions of the input A signal. The clockwise and counter clockwise portions of input A signal then destructively interfere at the first port of the first end of splitter 11 that is connected via circulator 10 to output Y. As a result, no signal will emerge at output Y. Meanwhile, the clockwise and counter clockwise portions of input A signal constructively interfere and reconstruct the input A signal at the second port of the first end of splitter 11 which is connected to output X. As a result, a reconstructed version of the input A signal emerges at output X. The switched mode of operation is commonly called the "loop" mode of operation, since the input signal fed to the first port of the first end of splitter 11 emerges at the second port of the first end of splitter 11 and the Sagnac switch acts like a loop.

As mentioned previously, the Sagnac switch can also be based on wavelength. This implementation is discussed in the cited references.

The Sagnac switch has several useful properties relevant this invention: the input A and input B are capable of handling optical rate signals; the input A and input B signals do not have to be the same wavelength; the input A and input B signals do not have to arrive simultaneously; the input B signal can be distorted; and the input B signal can control a wavelength division multiplexed input A signal.

SUMMARY

An ultrafast time division multiplexed optical communication system is implemented with an electronic-to-optical multiplexer and an optical-to-electronic demultiplexer.

In a first embodiment of the electronic-to-optical multiplexer, the electronic-to-optical multiplexer converts n electronic inputs $X_i$ into optical signals $Y_i$ where i=0 to n−1 and where each $Y_i$ has a different wavelength. The resulting optical signals are wavelength multiplexed. A first optical switch gates the wavelength multiplexed optical signals with an optical frame sync signal having a period of n*p seconds and a pulse width w. The gated optical signal is wavelength demultiplexed. The resulting optical signals are staggered by delays $D_i$, where $D_i$=i*p seconds. The delayed optical signals are wavelength multiplexed. A second optical switch uses the wavelength multiplexed optical signal to gate an optical clock signal having a period p and pulse width w. The gated optical clock signal is then used as the optical output of the electronic-to-optical multiplexer.

In a second embodiment of the electronic-to-optical multiplexer, the electronic-to-optical multiplexer converts n electronic inputs $X_i$ into optical signals $Y_i$ where i=0 to n−1 and where each $Y_i$ has a different wavelength. The resulting optical signals are wavelength multiplexed. A first optical switch gates the wavelength multiplexed optical signals with an optical frame sync signal having a period of n*p seconds and a pulse width w. The gated optical signal is wavelength demultiplexed. The resulting optical signals are staggered by delays $D_i$, where $D_i$=i*p seconds. The delayed optical signals are wavelength multiplexed. A second optical switch uses the wavelength multiplexed optical signal to gate a continuous wave optical signal. The gated optical signal is then used as the optical output of the electronic-to-optical multiplexer.

In a first embodiment of the optical-to-electronic demultiplexer, the optical-to-electronic demultiplexer wavelength multiplexes n optical sources $Z_i$ each with a different wavelength. A first optical switch gates the wavelength multiplexed optical signals with an equivalent of the optical clock signal. A second optical switch gates the clock gated optical signal with the input of the optical-to-electronic demultiplexer. The input gated optical signal is wavelength demultiplexed. The resulting optical signals are staggered by delays $DD_i$ where $DD_i$=(n−I)*p seconds, in a manner that is complementary to the stagger used by the electronic-to-optical multiplexer. The delayed optical signals are wavelength multiplexed. A third optical switch gates the wavelength multiplexed optical signal with an equivalent to the frame sync signal which has been delayed by (n−1)*p seconds. The gated optical signal is wavelength demultiplexed. The wavelength demultiplexed optical signals are detected by detectors $DECT_i$. The electronic outputs of detectors $DECT_i$ are then used as the electronic outputs of the optical-to-electronic demultiplexer.

In a second embodiment of the optical-to-electronic demultiplexer, the optical-to-electronic demultiplexer wavelength multiplexes n optical sources $Z_i$ each with a different wavelength. A first optical switch gates the wavelength multiplexed optical signal with the input of the optical-to-electronic demultiplexer. The input gated optical signal is wavelength demultiplexed. The resulting optical signals are staggered by delays $DD_i$, where $DD_i$=(n−i)*p seconds, in a manner which is complementary to the stagger used by the electronic-to-optical multiplexer. The delayed optical signals are wavelength multiplexed. A second optical switch gates the wavelength multiplexed optical signal with an equivalent to the frame sync signal which has been delayed by (n−1)*p seconds. The gated optical signal is wavelength demultiplexed. The wavelength demultiplexed optical signals are detected by detectors $DECT_i$. The electronic outputs of detectors $DECT_i$ are then used as the electronic outputs of the optical-to-electronic demultiplexer.

DRAWINGS—FIGURES

DETAILED DESCRIPTION

Figure 3:
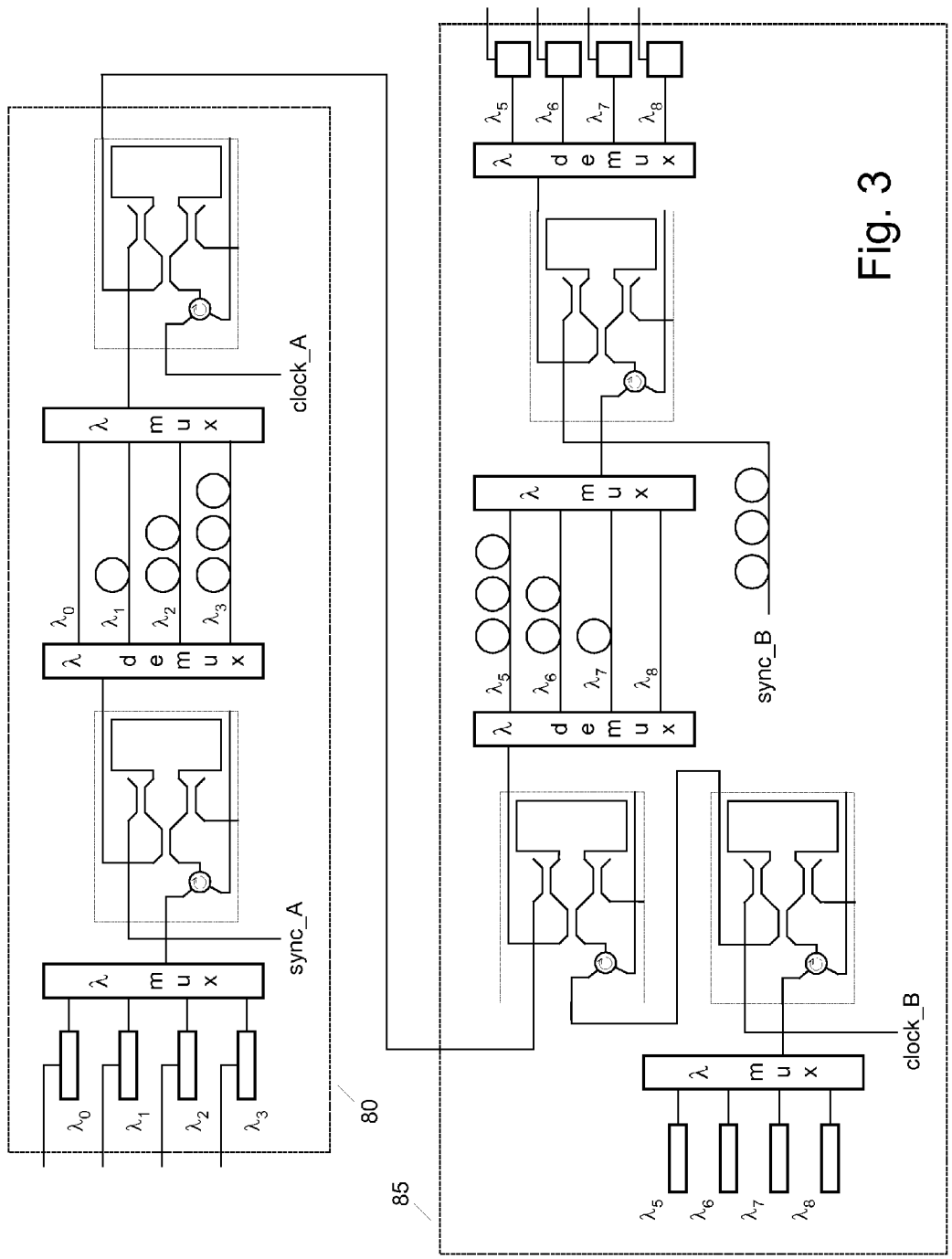
FIG. 3 shows an overview of optical communication system consisting of a wavelength multiplexed, delay based, time division electronic-to-optical multiplexer and a wavelength multiplexed, delay based, time division optical-to-electronic demultiplexer.
Figure 4:
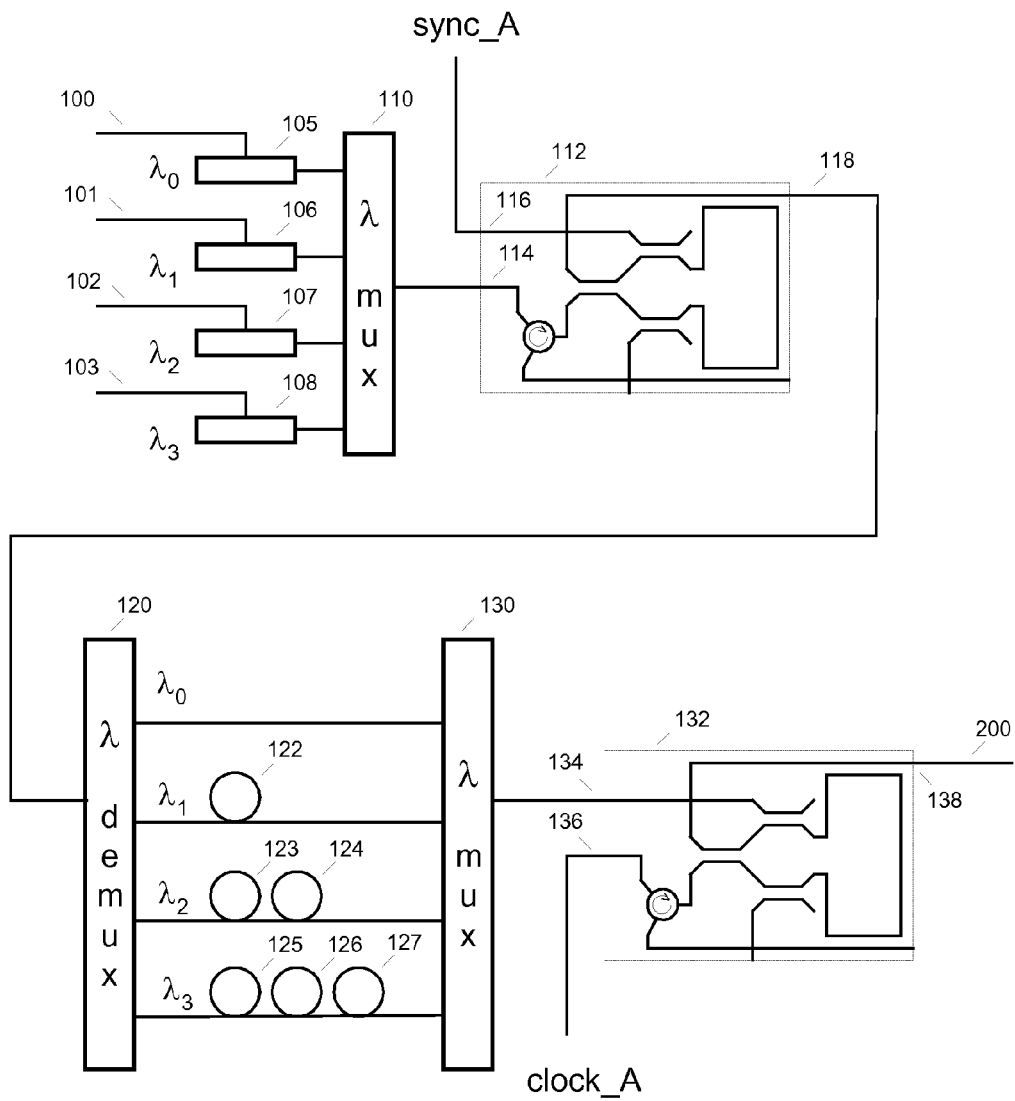
FIG. 4 shows a detailed view of a wavelength multiplexed, delay based, time division electronic-to-optical multiplexer.
Figure 5:
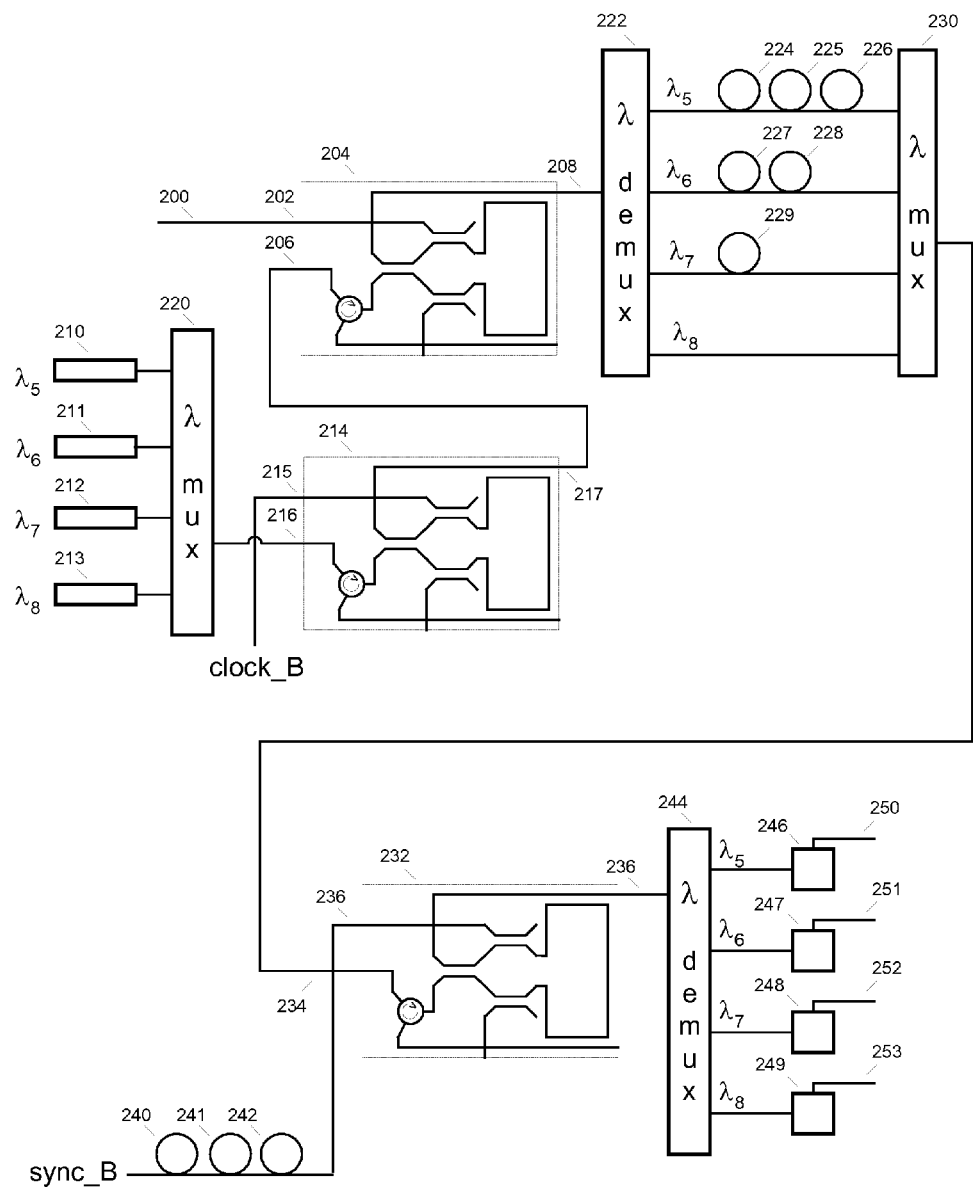
FIG. 5 shows a detailed view of a wavelength multiplexed, delay based, time division optical-to-electronic demultiplexer.

The ultrafast time division multiplexed optical communications system shown in FIG. 3 is comprised of an electronic-to-optical multiplexer 80 and an optical-to-electronic demultiplexer 85 shown in more detail in FIG. 4 and FIG. 5.

The electronic-to-optical multiplexer 80 is comprised of electronic inputs 100-103 connected to lasers 105-108 with wavelengths $\lambda_0$, $\lambda_1$, $\lambda_2$, and $\lambda_3$. The outputs of the lasers are connected to the inputs of a wavelength multiplexer 110. The output of the wavelength multiplexer 110 is connected to input A, 114, of a Sagnac switch 112 shown in FIG. 4. Control input B, 116, of Sagnac switch 112 is connected to a frame sync signal, sync_A. Output X, 118, of Sagnac switch 112 is connected to the input of a wavelength demultiplexer 120. Delay loops 122-127 each delay by a bit period, clock_A_period. The $\lambda_0$ output of wavelength demultiplexer 120 is connected to the $\lambda_0$ input of wavelength multiplexer 130. The $\lambda_1$ output of wavelength demultiplexer 120 is connected via delay loop 122 to the $\lambda_1$ input of wavelength demultiplexer 130. The $\lambda_2$ output of wavelength demultiplexer 120 is connected via delay loops 123 and 124 to the $\lambda_2$ input of wavelength demultiplexer 130. The $\lambda_3$ output of wavelength demultiplexer 120 is connected via delay loops 125, 126, and 127 to the $\lambda_3$ input of wavelength demultiplexer 130. The output of wavelength multiplexer 130 is connected to input B, 134, of Sagnac switch 132. Input A, 136, of Sagnac switch 132 is connected to an optical clock signal, clock_A. Output X, 138, of Sagnac switch 132 is used as the output of the electronic-to-optical demultiplexer. The output of the demultiplexer is connected to the input of optical link 200.

The optical-to-electronic demultiplexer is shown in FIG. 5. The output of optical link 200 is connected to the input of the optical-to-electronic demultiplexer 85. The input of the optical-to-electronic demultiplexer 85 is connected to input B, 202, of a Sagnac switch 204. The outputs of lasers 210-213 with wavelengths $\lambda_5$, $\lambda_6$, $\lambda_7$, and $\lambda_8$ are connected to the $\lambda_5$, $\lambda_6$, $\lambda_7$, and $\lambda_8$ inputs of wavelength multiplexer 220. The output of the wavelength multiplexer 220 is connected to input A, 216, of Sagnac switch 214. Input B, 215, of Sagnac switch 214 is connected to an optical clock signal, clock_B. Output X, 217, of Sagnac switch 214 is connected to input A, 206, of Sagnac switch 204. Output X, 208, of Sagnac switch 204 is connected to the input of wavelength demultiplexer 222. Delay loops 224-229 each delay by a bit period, clock_B_period. The $\lambda_5$ output of wavelength demultiplexer 222 is connected via delay loops 224, 225, and 226 to the $\lambda_5$ input of wavelength multiplexer 230. The $\lambda_6$ output of wavelength demultiplexer 222 is connected via delay loops 227 and 228 to the $\lambda_6$ input of wavelength multiplexer 230. The $\lambda_7$ output of wavelength demultiplexer 222 is connected via delay loops 229 to the $\lambda_7$ input of wavelength multiplexer 230. The $\lambda_8$ output of wavelength demultiplexer 222 is connected to the $\lambda_8$ input of wavelength multiplexer 230. The output of wavelength multiplexer 230 is connected to input A, 234, of Sagnac switch 232. A frame sync signal, sync_B, is connected via bit period delays 240, 241, and 242 to input B, 236, of Sagnac switch 232. Output X, 236, of Sagnac switch 232 is connected to the input of wavelength demultiplexer 244. The $\lambda_5$, $\lambda_6$, $\lambda_7$, and $\lambda_8$ outputs of wavelength demultiplexer 244 are connected to optical detectors 246-249. The electronic outputs of detectors 246-249 are connected to the outputs 250-253 of the optical-to-electronic demultiplexer 85.

Figure 6:
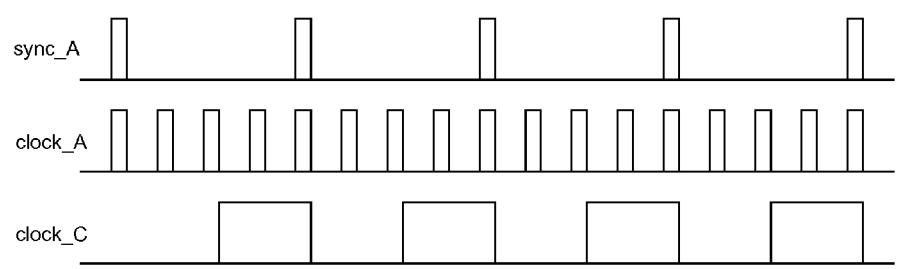
FIG. 6 shows the sync_A, clock_A, and clock_C signals and their temporal relationship.
Figure 7:
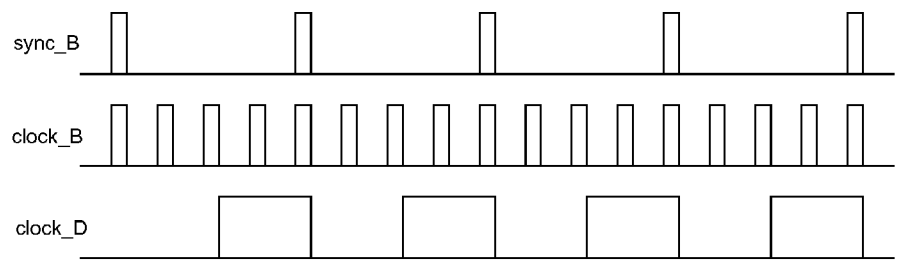
FIG. 7 shows the sync_B, clock_B, and clock_D signals and their temporal relationship.
Figure 8:
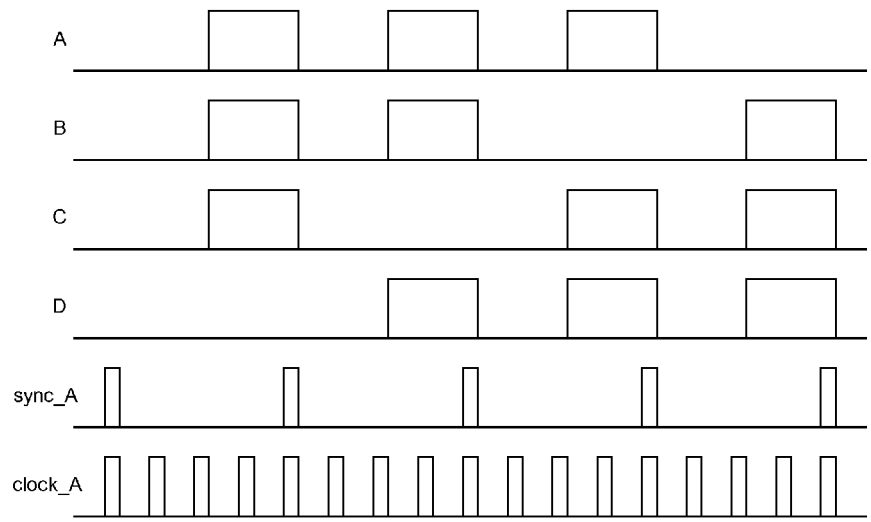
FIG. 8 shows electronic input signals A, B, C, and D and their temporal relationship with sync_A and clock_A.
Figure 9:
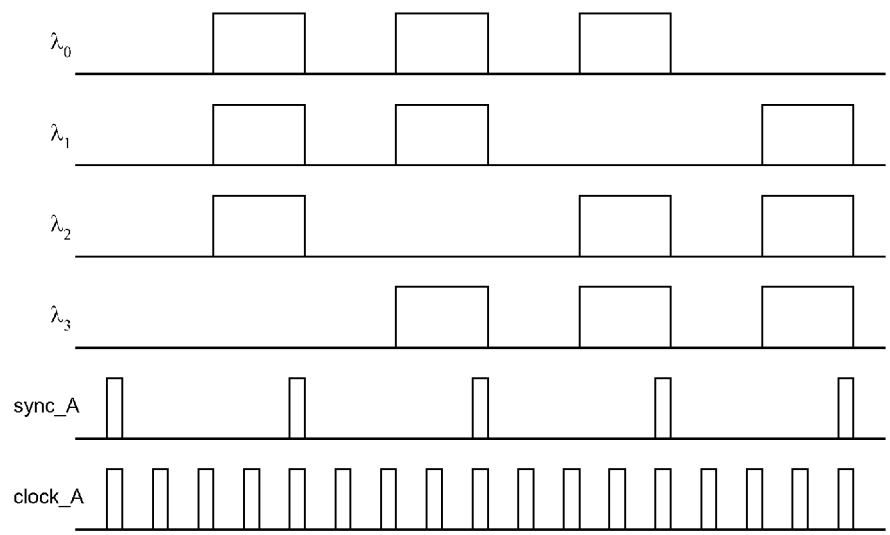
FIG. 9 shows optical signals $\lambda_0$, $\lambda_1$, $\lambda_2$, and $\lambda_3$ that are the optical equivalents to electronic signals shown in FIG. 8.
Figure 10:
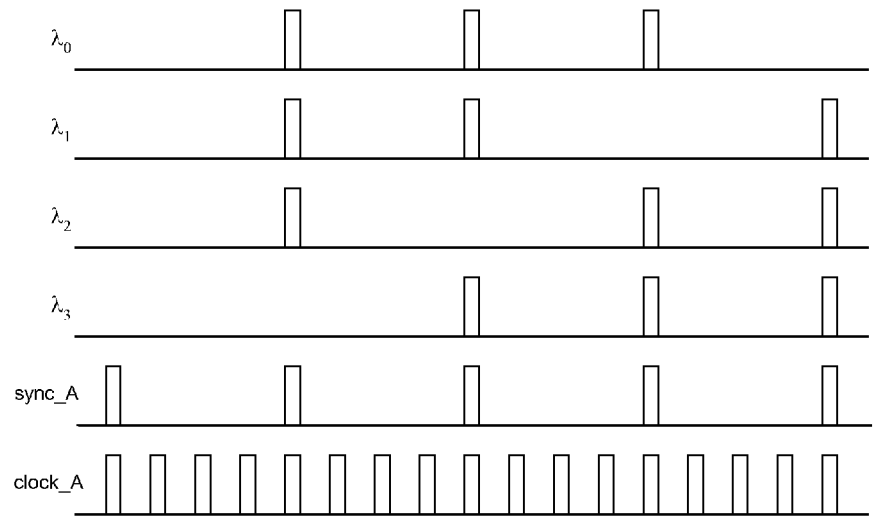
FIG. 10 shows optical signals $\lambda_0$, $\lambda_1$, $\lambda_2$, and $\lambda_3$ sampled by frame sync signal, sync_A.
Figure 11:
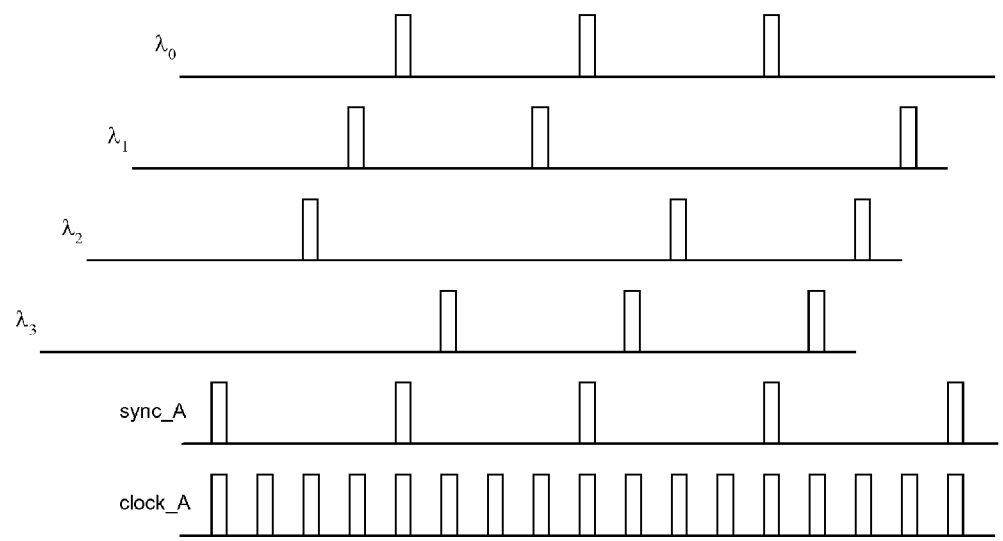
FIG. 11 shows the optical signals in FIG. 10 staggered by various delays.
Figure 12:
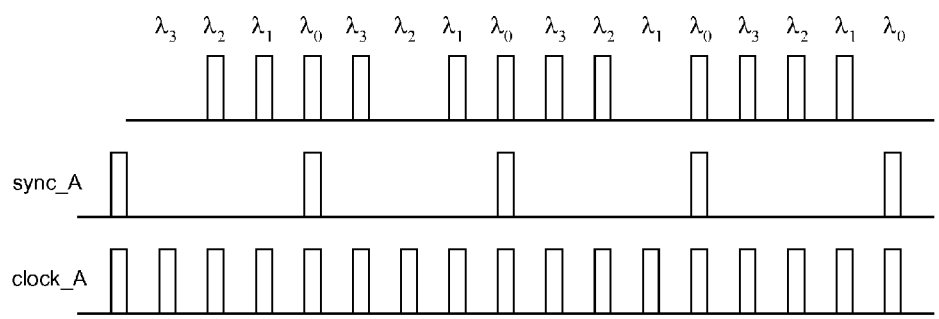
FIG. 12 shows the staggered optical signals in FIG. 11 temporally interlaced and wavelength multiplexed.
Figure 13:
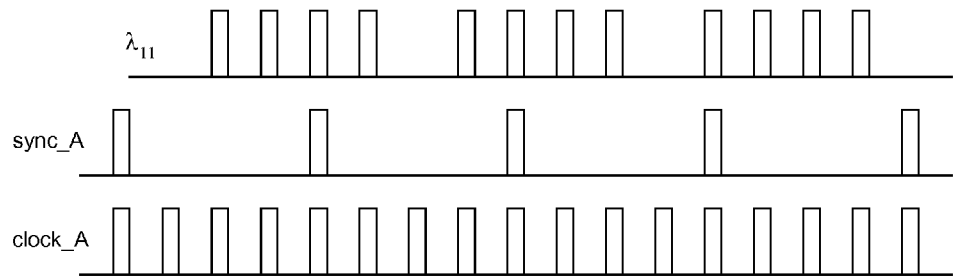
FIG. 13 shows an optical clock signal clock_A gated by the optical signal shown in FIG. 12.

As an example of how such an ultrafast optical communications system operates, assume a periodic optical clock signal, clock_A, as shown in FIG. 6 with a period clock_A_period, a pulse width of clock_A_pulsewidth, and a wavelength $\lambda_{11}$ connected to the clock_A inputs shown in FIG. 3 and FIG. 4. Assume a periodic optical clock signal, clock_B, as shown in FIG. 7 with a period clock_B_period, a pulse width of clock_B_pulsewidth, and a wavelength $\lambda_{13}$ connected to the clock_B inputs shown in FIG. 3 and FIG. 5. Assume that clock_A and clock_B are identical and that sync_A and sync_B are identical. Assume a periodic optical frame sync signal, sync_A, as shown in FIG. 6 with a period of sync_A_period, a pulse width of sync_A_pulsewidth, a wavelength of $\lambda_{10}$, and synchronized with the clock_A signal; connected to the sync_A inputs shown in FIG. 3 and FIG. 4. Assume a periodic optical frame sync signal, sync_B, as shown in FIG. 7 with a period of sync_B_period, a pulse width of sync_B_pulsewidth, a wavelength of $\lambda_{12}$, and synchronized with the sync_A signal; connected to the sync_B inputs shown in FIG. 3 and FIG. 5. Assume a periodic electronic clock signal, clock_C, shown in FIG. 6 and synchronized with sync_A and clock_A. Assume a periodic electronic clock signal, clock_D, shown in FIG. 7 and synchronized with sync_B and clock_B. Assume return-to-zero (RZ) electronic signals labeled A, B, C, and D as shown in FIG. 8 with bit sequences 0111, 1011, 1101, and 1110 relative to clock_C. Assume that these electronic signals are connected to inputs 100-103 of lasers 105-108 with wavelengths $\lambda_0$, $\lambda_1$, $\lambda_2$, and $\lambda_3$ then the output of the lasers are shown in FIG. 9 would be 0000110011001100, 1100000011001100, 1100110000001100, and 1100110011000000 relative to sync_A and clock_A. These optical signals are then wavelength multiplexed. Sagnac switch 112 then gates these wavelength multiplexed optical signals with frame sync signal, sync_A. The output of the Sagnac switch 112 is shown in FIG. 10 as 0000100001000010000, 100000000010001000, 1000100000001000, and 1000100010000000 relative to sync_A and clock_A. The gated wavelength multiplexed signals are wavelength demultiplexed. The wavelength demultiplexed signals $\lambda_0$, $\lambda_1$, $\lambda_2$, and $\lambda_3$ are delayed by 0, 1, 2, and 3 bit periods as shown in FIG. 11. The resulting optical signals are 0000010001000010000, X10000000100010000, XX10001000000001000, and XXX1000100010000000 relative to sync_A and clock_A. The resulting optical signals are wavelength multiplexed as shown in FIG. 12. The interlaced multiple wavelength result $(\lambda_0\lambda_1\lambda_2\lambda_3(\lambda_0\lambda_1\lambda_2\lambda_3(\lambda_0\lambda_1\lambda_2\lambda_3(\lambda_0\lambda_1\lambda_2\lambda_3)$ is 0111101111011110 relative to sync_A and clock_A. Sagnac switch 122 uses the interlaced wavelength multiplexed signal to gate an optical clock signal, clock_A. The result is shown in FIG. 13 as 0111101111011110 relative to sync_A and clock_A. This optical signal is then used as the output of the electronic-to-optical multiplexer.

Figure 14:
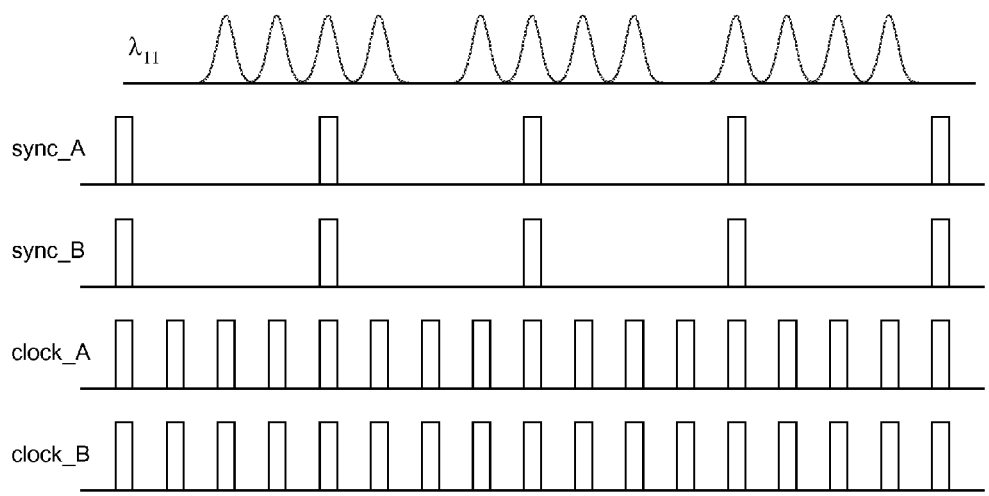
FIG. 14 shows the output of the electronic-to-optical multiplexer distorted by a transmission link and relative to sync_A, sync_B, clock_A, and clock_B.
Figure 15:
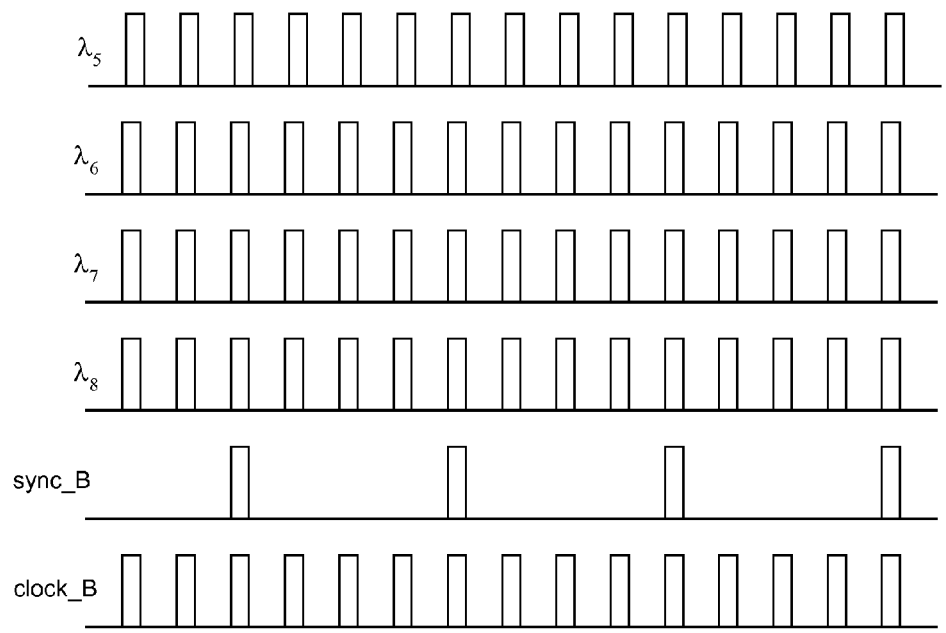
FIG. 15 shows the output of n optical sources gated by optical clock signal, clock_B.
Figure 16:
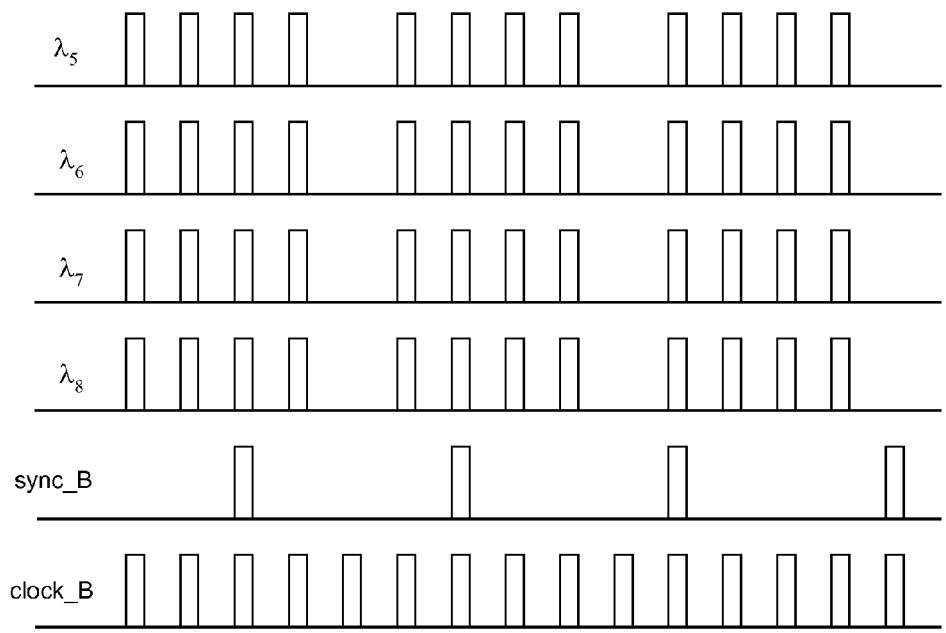
FIG. 16 shows the multiple wavelength optical signals in FIG. 15 gated by the input of the optical-to-electronic demultiplexer.
Figure 17:
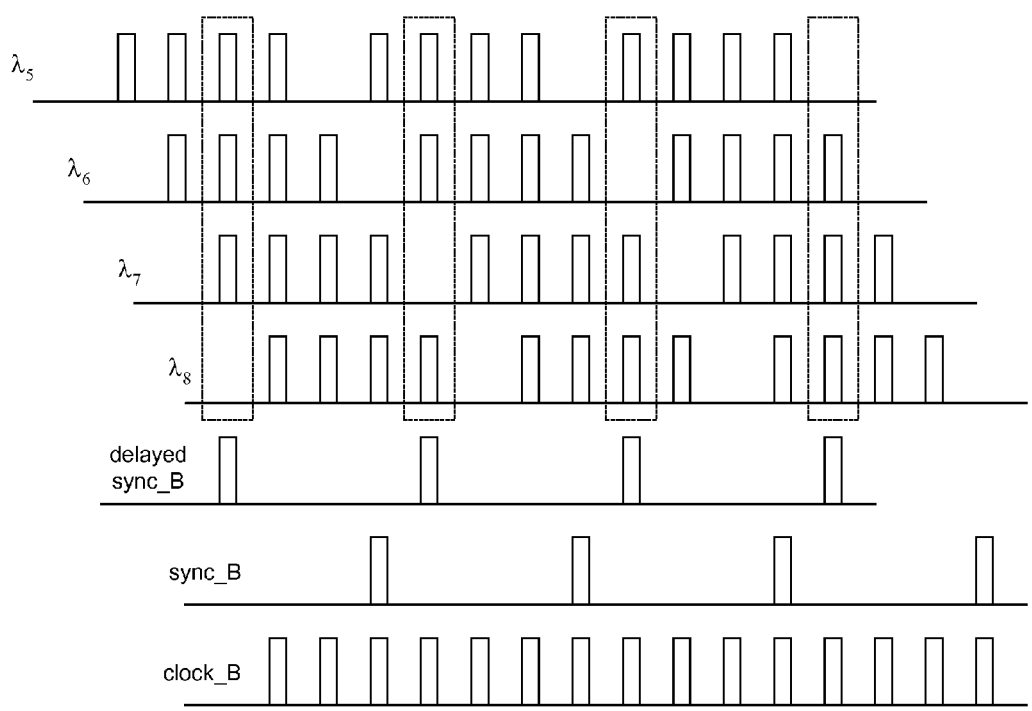
FIG. 17 shows the optical signals in FIG. 16 delayed in a staggered manner that is complementary to the stagger shown in FIG. 11.
Figure 18:
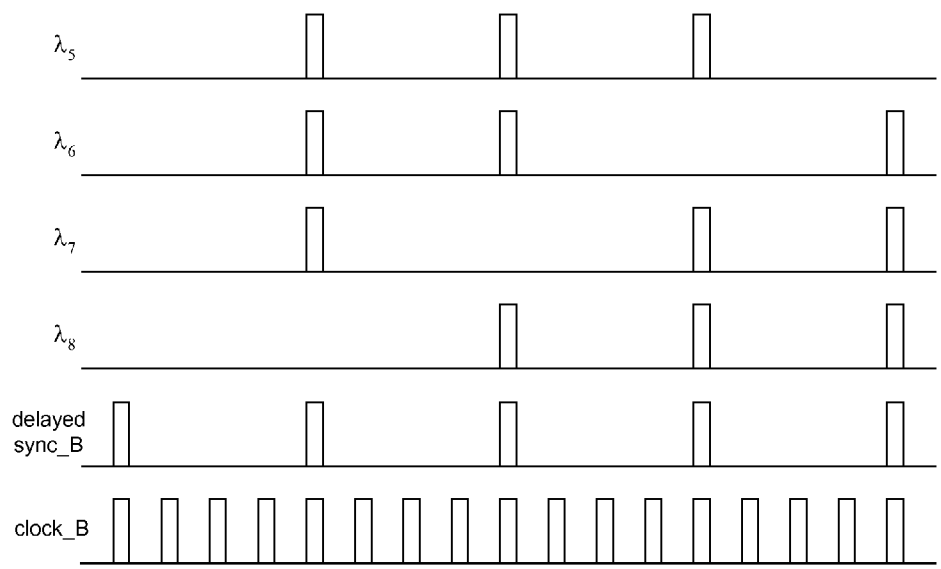
FIG. 18 shows the optical signals in FIG. 17 gated by a delayed frame sync signal, sync_B.
Figure 19:
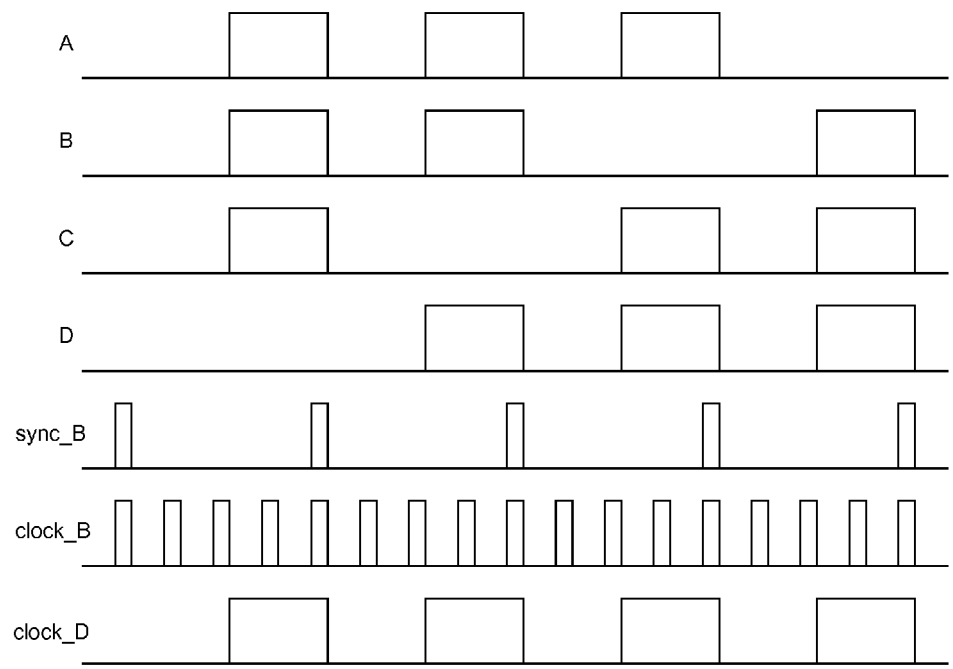
FIG. 19 shows the gated optical signals in FIG. 18 wavelength demultiplexed, detected, and converted to a return-to-zero electronic signal.

The output of the electronic-to-optical multiplexer is connected to optical link 200. The output of the optical link 200 is shown in FIG. 14 relative to sync_A, sync_B, clock_A, and clock_B and connected to the input of the optical-to-electronic multiplexer. The outputs of lasers 210-216 with wavelengths $\lambda_5$, $\lambda_6$, $\lambda_7$, and $\lambda_8$ are wavelength multiplexed. Sagnac switch 214 gates the wavelength multiplexed laser outputs with clock_B. The result is shown in FIG. 15 as 1111111111111111, 1111111111111111, 1111111111111111, and 1111111111111111 relative to sync_B and clock_B. The result is wavelength multiplexed. Sagnac switch 204 gates the result with the input of the optical-to-electronic multiplexer. The result is shown in FIG. 16 as 0111101111101111, 011110111101111, 0111101111101111, and 011110111101111 relative to clock_B and sync_B. The resulting optical signal is wavelength demultiplexed. The wavelength demultiplexed signals $\lambda_5$, $\lambda_6$, $\lambda_7$, and $\lambda_8$ are delayed by 3, 2, 1, and 0 bit periods. The resulting signals are shown in FIG. 17 as XXX011110111101111, XX011110111101111, X011110111101111, and 011110111101111 relative to clock_B and sync_B. The resulting signals are wavelength multiplexed. The sync_B signal is delayed by 3 bit periods as shown in FIG. 17. A Sagnac switch gates the wavelength multiplexed signal with the delayed sync_B signal as shown in FIG. 17. The resulting gated wavelength multiplexed signals are shown in FIG. 18 as 0000100010001000, 1000000010001000, 1000100000001000, and 1000100010000000 relative to delayed sync_B and clock_B. The gated wavelength multiplexed signals are wavelength demultiplexed and converted to electronic signals by photo detectors. The electronic outputs can then be converted to the return-to-zero (RZ) signals as shown in FIG. 19. The results 0111, 1011, 1101, and 1110 relative to clock_D shown in FIG. 19 are identical to the electronic inputs shown in FIG. 8.

Figure 20:
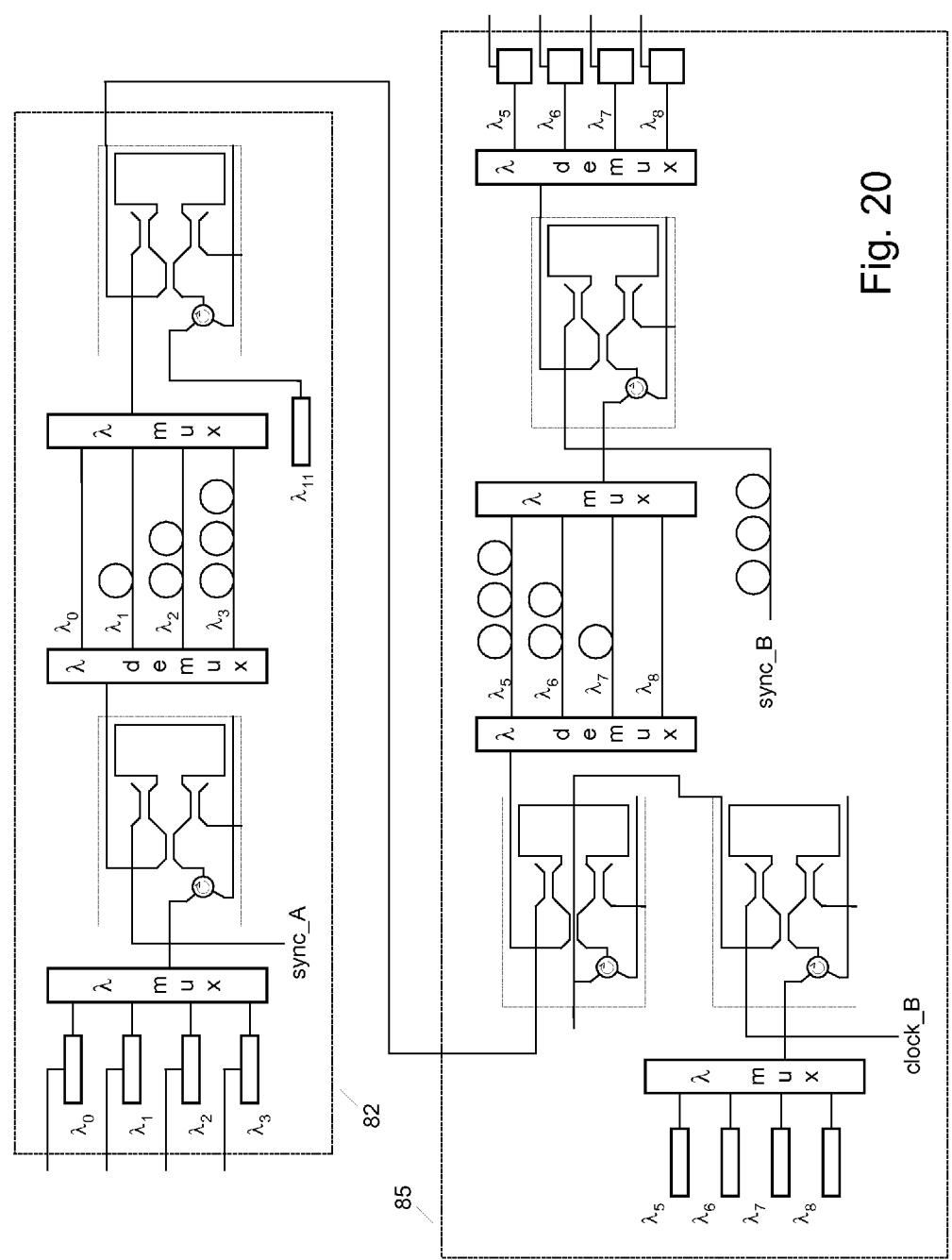
FIG. 20 shows an overview of a second embodiment of the electronic-to-optical multiplexer.
Figure 21:
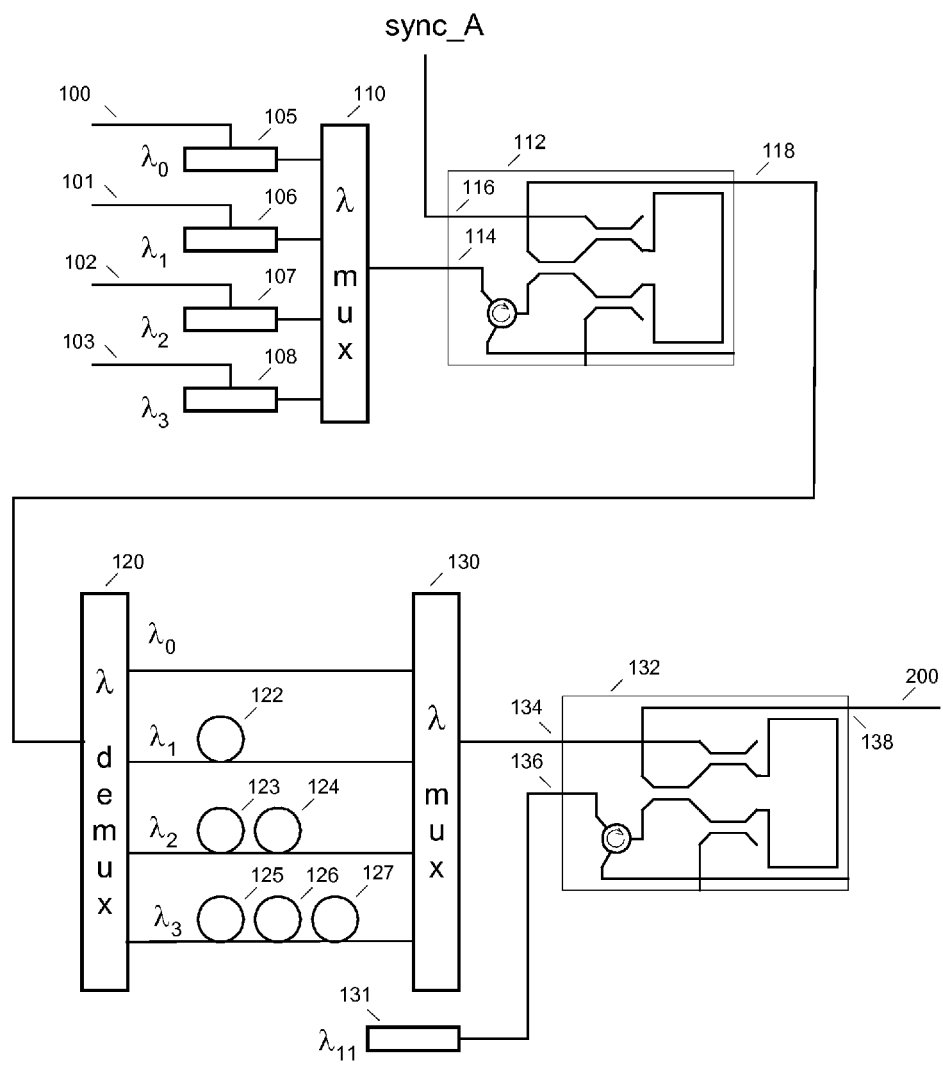
FIG. 21 shows a detailed view of the second embodiment of the electronic-to-optical multiplexer.

A second embodiment of the electronic-to-optical multiplexer 82 is shown in FIG. 20 and FIG. 21. The difference between the electronic-to-optical multiplexer 82 shown in FIG. 21 and the electronic-to-optical multiplexer 80 shown in FIG. 4 is that clock_A signal connected to input A, 136, of Sagnac switch 132 is replaced by the output of a continuous wave laser 131 with a wavelength of $\lambda_{11}$. In the case of the first embodiment of the electronic-to-optical multiplexer 80 shown in FIG. 4 Sagnac switch 132 gates clock_A with the output of wavelength multiplexer 130. This converts the output of wavelength multiplexer 130 to $\lambda_{11}$ and it also re-times the output of wavelength multiplexer 130 to clock_A and eliminates any jitter introduced by delays 122-127. In the case of the second embodiment of the electronic-to-optical multiplexer 82 shown in FIG. 21 Sagnac switch 132 gates the output of laser 131 with the output of wavelength multiplexer 130. This converts the output of wavelength multiplexer 130 to $\lambda_{11}$ but it does not re-time the output of wavelength 130 to clock_A.

Figure 22:
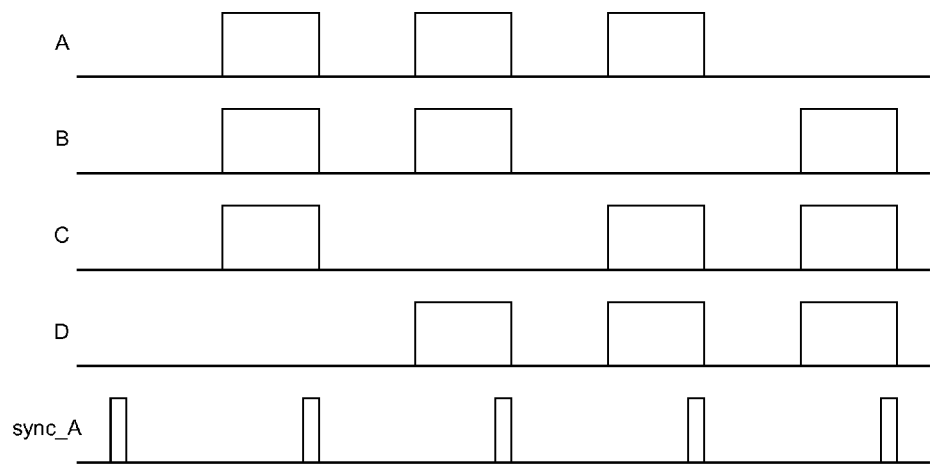
FIG. 22 shows electronic input signals A, B, C, and D and their temporal relationship with sync_A and clock_A.
Figure 23:
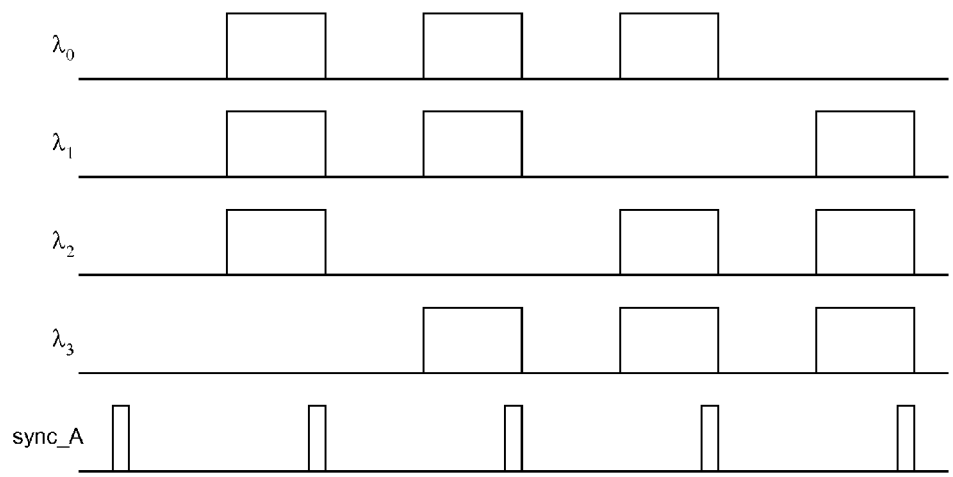
FIG. 23 shows optical signals $\lambda_0$, $\lambda_1$, $\lambda_2$, and $\lambda_3$ that are the optical equivalents to electronic signals shown in FIG. 22.
Figure 24:
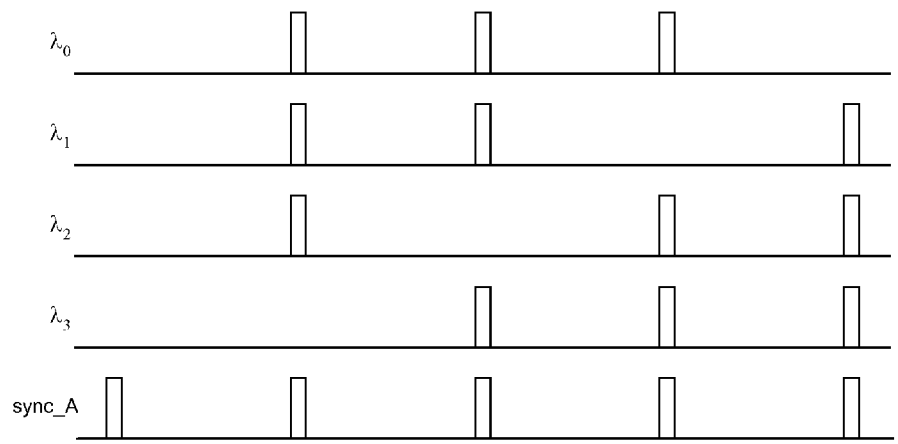
FIG. 24 shows optical signals $\lambda_0$, $\lambda_1$, $\lambda_2$, and $\lambda_3$ sampled by frame sync signal, sync_A.
Figure 25:
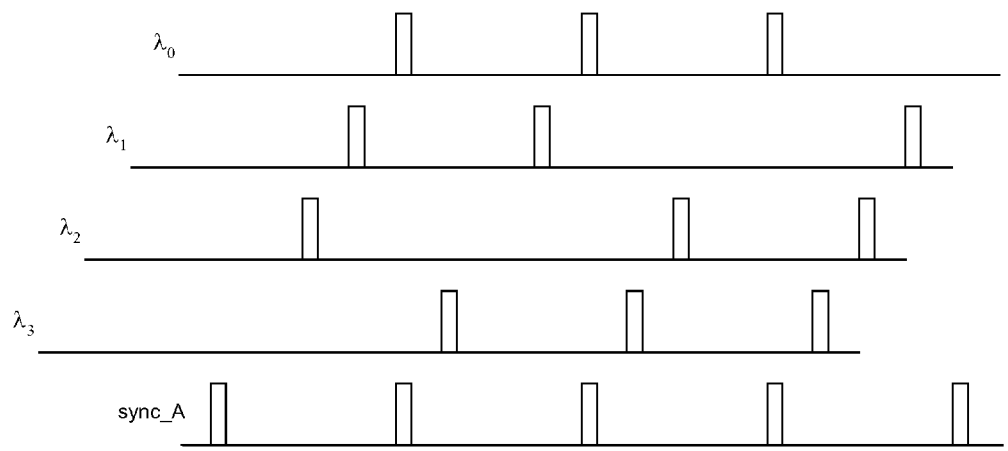
FIG. 25 shows the optical signals in FIG. 24 staggered by various delays.
Figure 26:
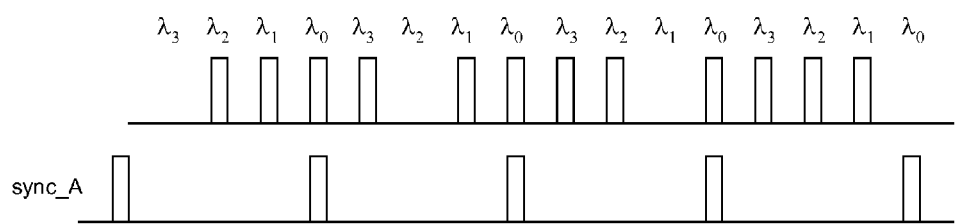
FIG. 26 shows the staggered optical signals in FIG. 25 temporally interlaced and wavelength multiplexed.
Figure 27:
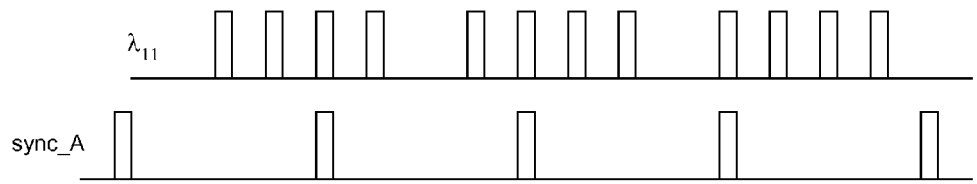
FIG. 27 shows the output of laser 131 gated by the optical signal shown in FIG. 26.

The second embodiment of the electronic-to-optical multiplexer shown in FIG. 21 takes the electronic inputs shown in FIG. 22 and converts it into the optical outputs shown in FIG. 23. Sagnac 112 then gates these optical signals with sync_B as shown in FIG. 24. These optical signals are then delayed by delays 122-127 as shown in FIG. 25. The temporally interlaced multiple wavelength output of wavelength multiplexer 130 is shown in FIG. 26. Sagnac gate 132 uses this optical signal to gate the output of laser 131. The result as shown in FIG. 27 is used the output of electronic-to-optical multiplexer 82.

Figure 28:
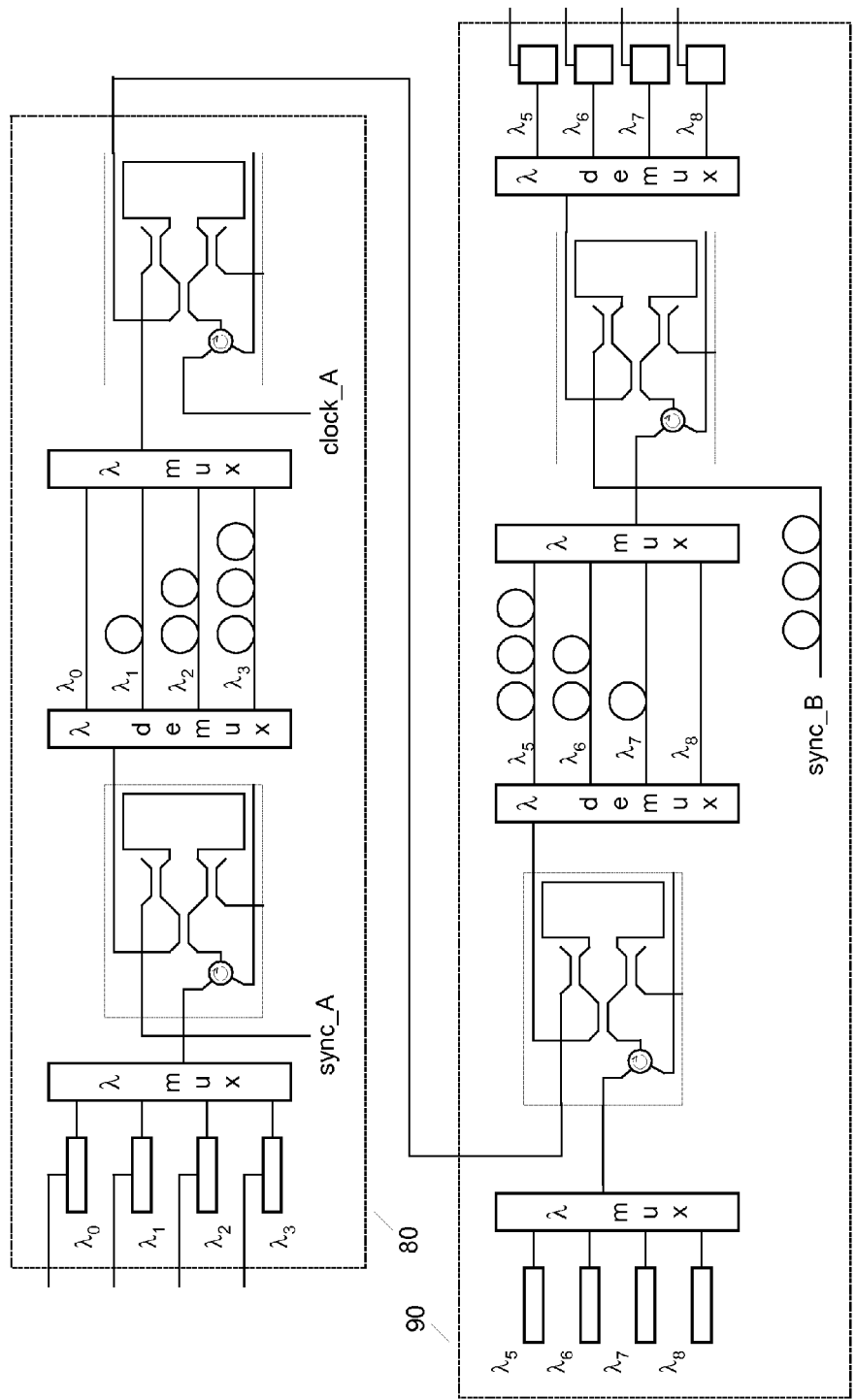
FIG. 28 shows an overview of a second embodiment of the optical-to-electronic demultiplexer.
Figure 29:
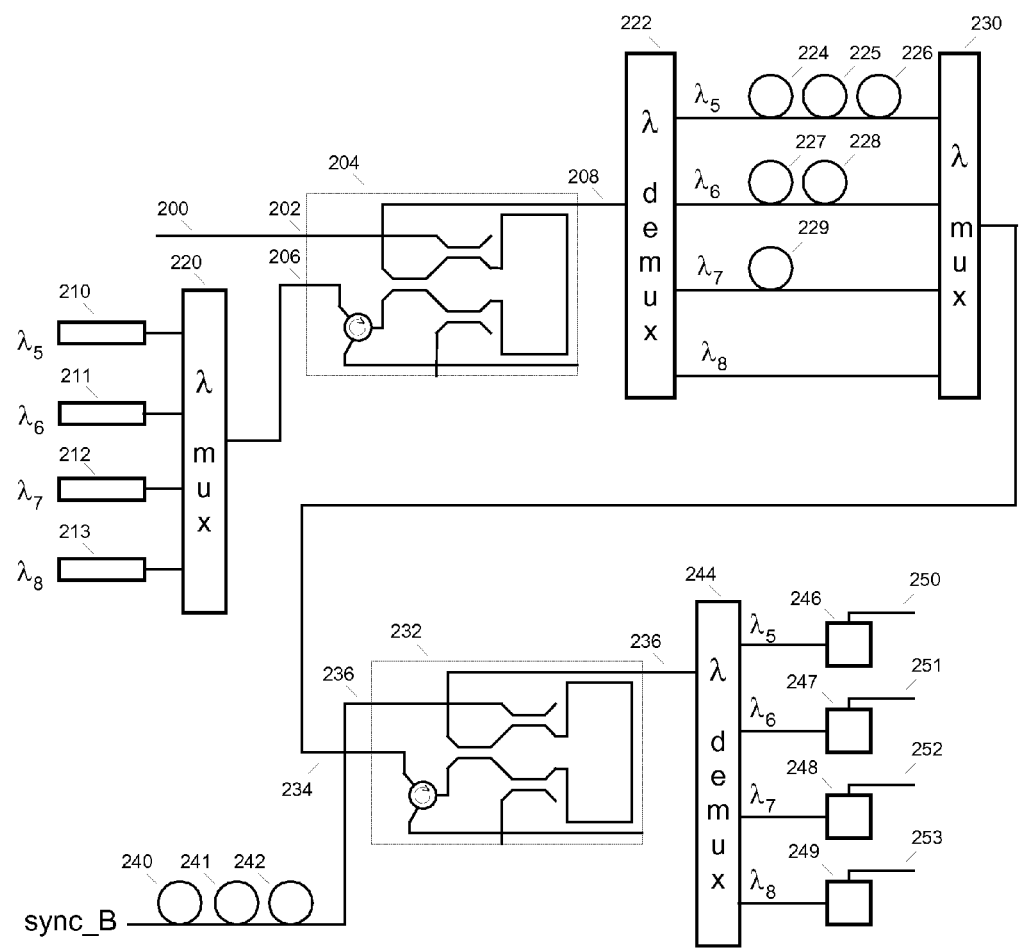
FIG. 29 shows a detailed view of the second embodiment of the optical-to-electronic demultiplexer.
Figure 30:
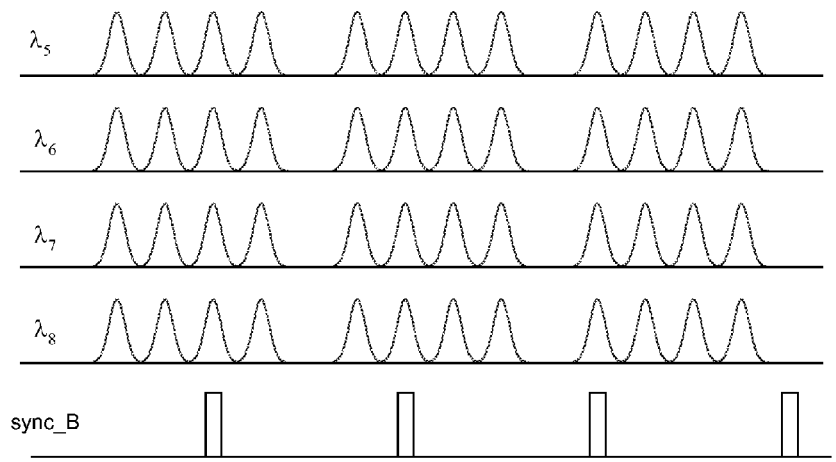
FIG. 30 shows the output of n optical sources gated by the input of the optical-to-electronic demultiplexer.
Figure 31:
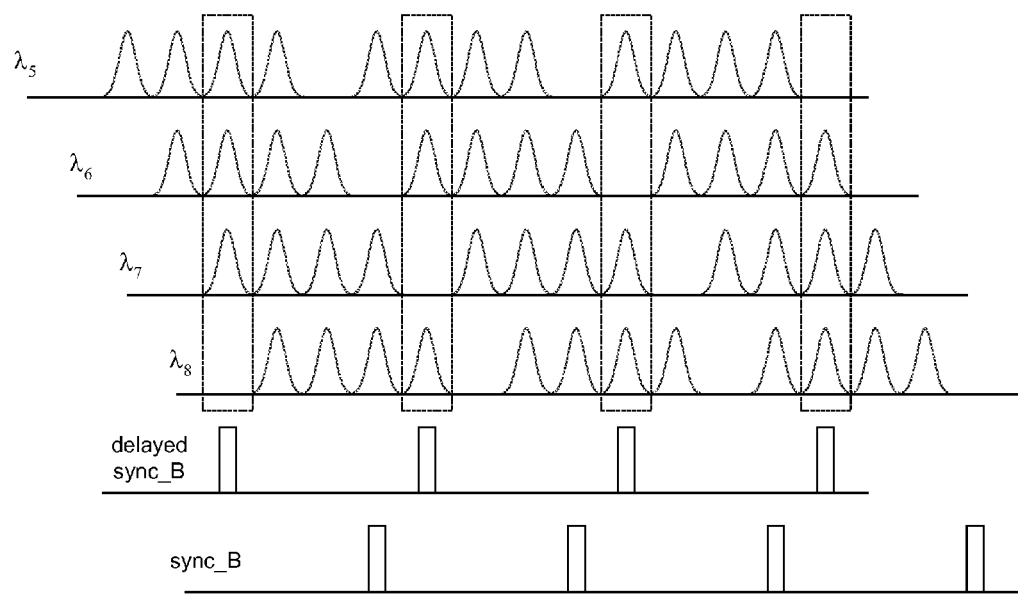
FIG. 31 shows the input gated optical signals shown in FIG. 30 staggered in a manner complementary to the stagger in FIG. 11.
Figure 32:
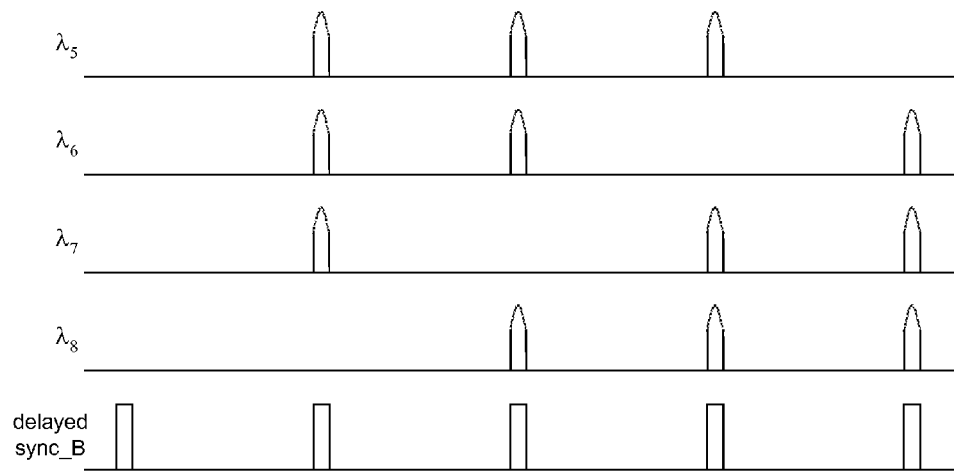
FIG. 32 shows signals shown in FIG. 31 wavelength multiplexed and sampled by a delayed version of frame sync signal, sync_B.

A second embodiment of the optical-to-electronic demultiplexer 85 is shown in FIG. 28 and FIG. 29. The difference between the optical-to-electronic demultiplexer 90 shown in FIG. 29 and the optical-to-electronic demultiplexer 85 shown in FIG. 5 is that Sagnac switch 214 is eliminated and the output of wavelength multiplexer 220 is directly connected input A 206 of Sagnac switch 204. This changes the output of output X, 208, of Sagnac switch 204 from that shown in FIG. 16 to that shown in FIG. 30. In the case of the first embodiment of the optical-to-electronic demultiplexer shown in FIG. 16, Sagnac switch 214 gates the output of the wavelength multiplexer 220 with clock_B to produce copies of clock_B in $\lambda_5, \lambda_6, \lambda_7$, and $\lambda_8$ wavelengths. Sagnac switch 204 then uses the input of the optical-to-electronic demultiplexer to gate the different wavelength copies of clock_B. In the case of the second embodiment of the optical-to-electronic demultiplexer shown in FIG. 30, Sagnac switch 204 uses the input to the optical-to-electronic demultiplexer to gate the wavelength multiplexed outputs of lasers 210-213 to produce copies of the input of the optical-to-electronic demultiplexer in $\lambda_5, \lambda_6, \lambda_7$, and $\lambda_8$ wavelengths. The different wavelength copies of the input at output X, 208, of Sagnac switch 204 are then wavelength demultiplexed. The wavelength demultiplexed optical signals are delayed by 3, 2, 1, and 0 clock_B_period bit periods as shown FIG. 31. The results are then wavelength multiplexed by wavelength multiplexer 230. Sagnac switch 232 gates the delayed wavelength multiplexed copies of the input with a sync_B signal that has been delayed by three clock_B_period bit periods as shown in FIG. 32. The result is wavelength demultiplexed by wavelength demultiplexer 244. The $\lambda_5, \lambda_6, \lambda_7$, and $\lambda_8$ signals are detected by detectors 246-249. Electronic outputs 250-253 can then be converted into the return-to-zero electronic signals shown in FIG. 33.

In general, the electronic-to-optical multiplexer converts n electronic signals, $X_i$, where i=0 to n−1, into optical signals, $Y_i$, each with a different wavelength $\lambda_i$. The optical signals are wavelength multiplexed together and sampled by a frame sync signal. The sampled optical signals $Y_i$ are wavelength demultiplexed and delayed by i bit periods of delay. The resulting optical signals are wavelength multiplexed. The wavelength multiplexed signal gates an optical clock signal. This converts the wavelength multiplexed signal into a signal the same wavelength as the optical clock signal. This signal is used as the optical output of the electronic-to-optical multiplexer. Sagnac switch 112 functions as a multiple wavelength sampler. Sagnac switch 132 functions as a wavelength converter. The delays stagger the sampled input signals. Given a multiplex frame of n time slots each a bit period wide, a delay of k puts the sampled optical signal into the kth time slot where k is any value {0, . . . n−1}.

In general the optical-to-electronic demultiplexer generates n different optical signals, $Z_i$ where i=0 to n−1. The generated signals are wavelength multiplexed and gated by the optical-to-electronic demultiplexer input signal. The input gated wavelength multiplexed signals are wavelength demultiplexed. The wavelength demultiplexed optical signals are delayed by (n−1)−i bit periods of delay. The resulting signals are wavelength multiplexed and gated by a frame sync signal that has been delayed by (n−1) bit periods. The gated wavelength multiplexed signal is wavelength demultiplexed and each optical signal $Z_i$ is detected and converted to an electrical signal $W_i$ that is used as the output of the optical-to-electronic demultiplexer. Sagnac switch 204 functions as a multiple wavelength signal replicator. Sagnac switch 232 functions as a multiple wavelength signal sampler. Sagnac switch 214 functions as a multiple wavelength signal replicator. Given a multiplex frame of n time slots each a bit period wide, a delay of (n−1)−k bit periods extracts the kth time slot of the multiplex frame where k is any value {0, . . . n−1}.

Figure 1:
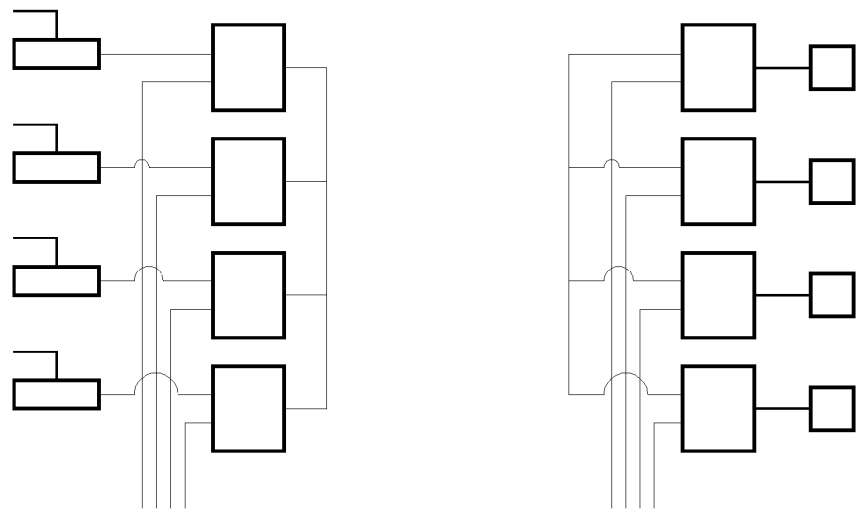
FIG. 1 (prior art) shows an optical communication system comprising an electronic-to-optical multiplexer implemented with some lasers and optical gates or switches; an optical link; and an optical-to-electronic demultiplexer implemented with some optical gates or switches and some detectors.
Figure 2:
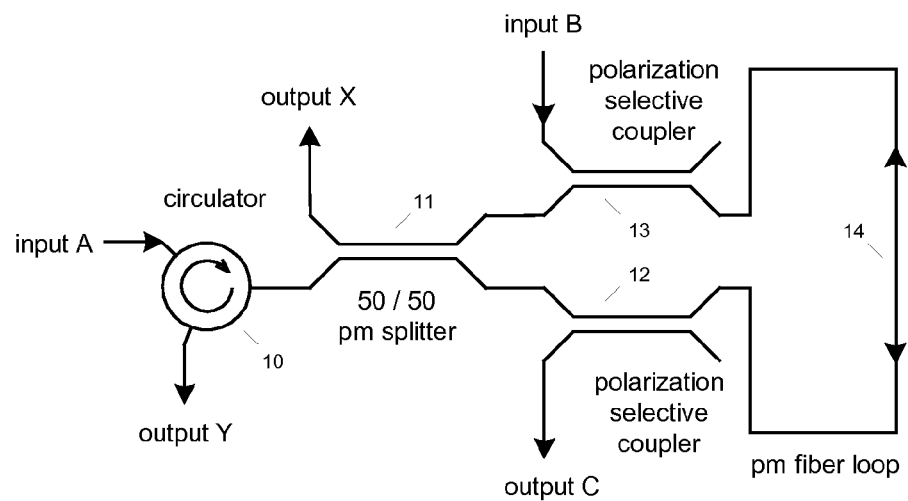
FIG. 2 (prior art) shows a polarization based optical Sagnac switch comprising of an optical circulator, 50/50 polarization maintaining splitter, polarization dependent combiner, a loop of polarization maintaining optical fiber, and a polarization dependent splitter.

In perspective, most n input electronic-to-optical multiplexers require n electronic-to-optical converters and n switches as shown in FIG. 1 to select an input; while the electronic-to-optical multiplexer 80 as shown in FIG. 3 requires n electronic-to-optical converters and two multiple wavelength optical switches and while electronic-to-optical multiplexer 82 as shown in FIG. 20 requires n electronic-to-optical converters, two multiple wavelength optical switches, and one optical source. Most n output optical-to-electronic demultiplexers as shown in FIG. 1 require n switches to select an output and n detectors; while the optical-to-electronic demultiplexer 85 as shown in FIG. 3 requires n optical sources, three multiple wavelength optical switches, and n detectors and while the optical-to-electronic demultiplexer 90 as shown in FIG. 28 requires n optical sources, two multiple wavelength optical switches, and n detectors.

Lasers 105-108 can each be replaced with continuous wave laser and an optical modulator. Lasers 210-213 and wavelength multiplexer 220 as shown in FIG. 5 can be replaced with a multiple wavelength laser. Lasers 210-213 and wavelength multiplexer 220 as shown in FIG. 29 can be replaced with a multiple wavelength laser. Lasers 210-213; wavelength multiplexer 220; Sagnac switch 214; and the clock_B signal as shown in FIG. 5 can be replaced with a mode locked multiple wavelength laser.

The polarization based Sagnac switches can be replaced by wavelength based Sagnac switches.

The wavelength demultiplexers and wavelength multiplexers can be based on array waveguide gratings (AWG's).

The order of the stagger in the delays in the either the electronic-to-optical multiplexer or the optical-to-electronic demultiplexer does not have to be linear. The order of the stagger in the delays in the either the electronic-to-optical multiplexer or the optical-to-electronic demultiplexer does not have to be complementary. This is only required if it is desirable for inputs 100-103 to emerge at outputs 250-253 respectively. It is not necessary for delay loops 122-127 and 224-229 to be a bit period long, clock_A_period. They can be as short as the sample window width, sync_A_pulsewidth. The import thing is that the samples that correspond to inputs 100-103 do not temporally overlap when they are temporally interlaced.

Figure 34:
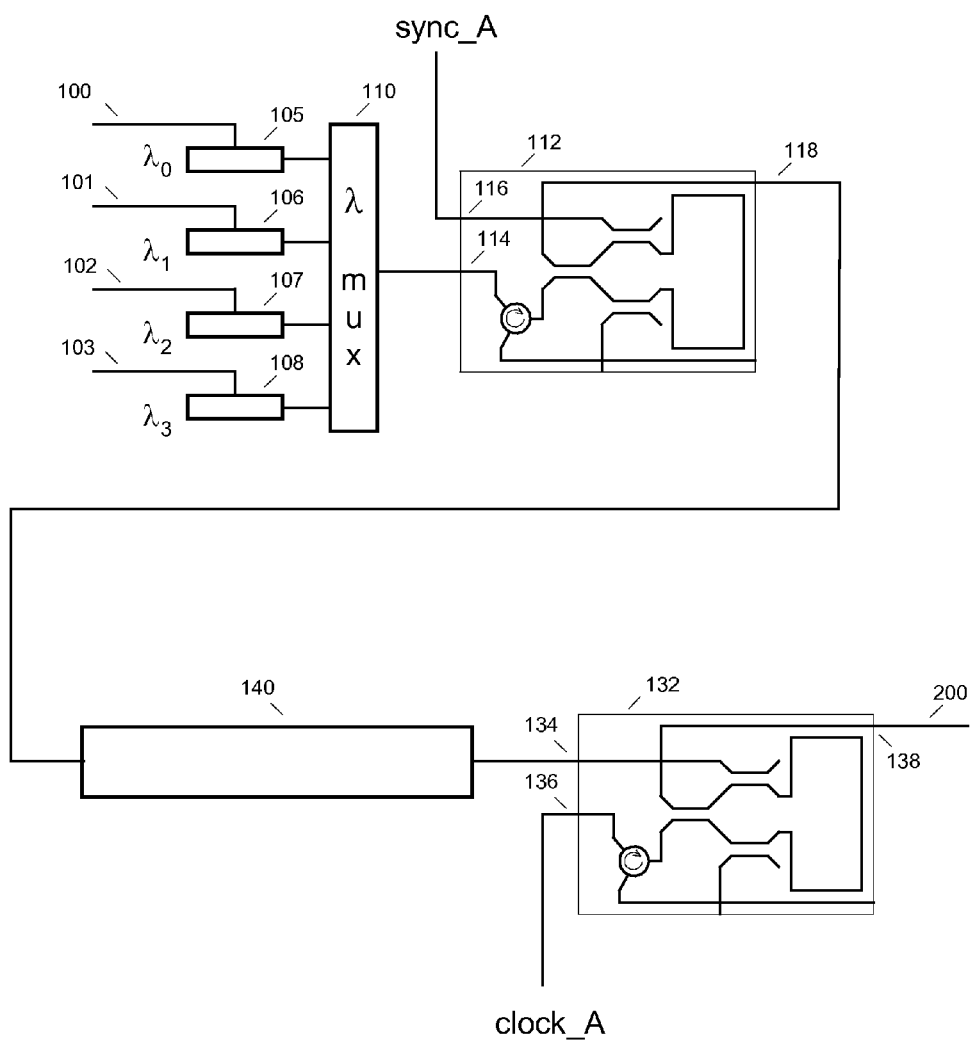
FIG. 34 shows a version of the electronic-to-optical multiplexer 80 in which the staggered wavelength dependent delays have been implemented with a wavelength dependent dispersion element.
Figure 35:
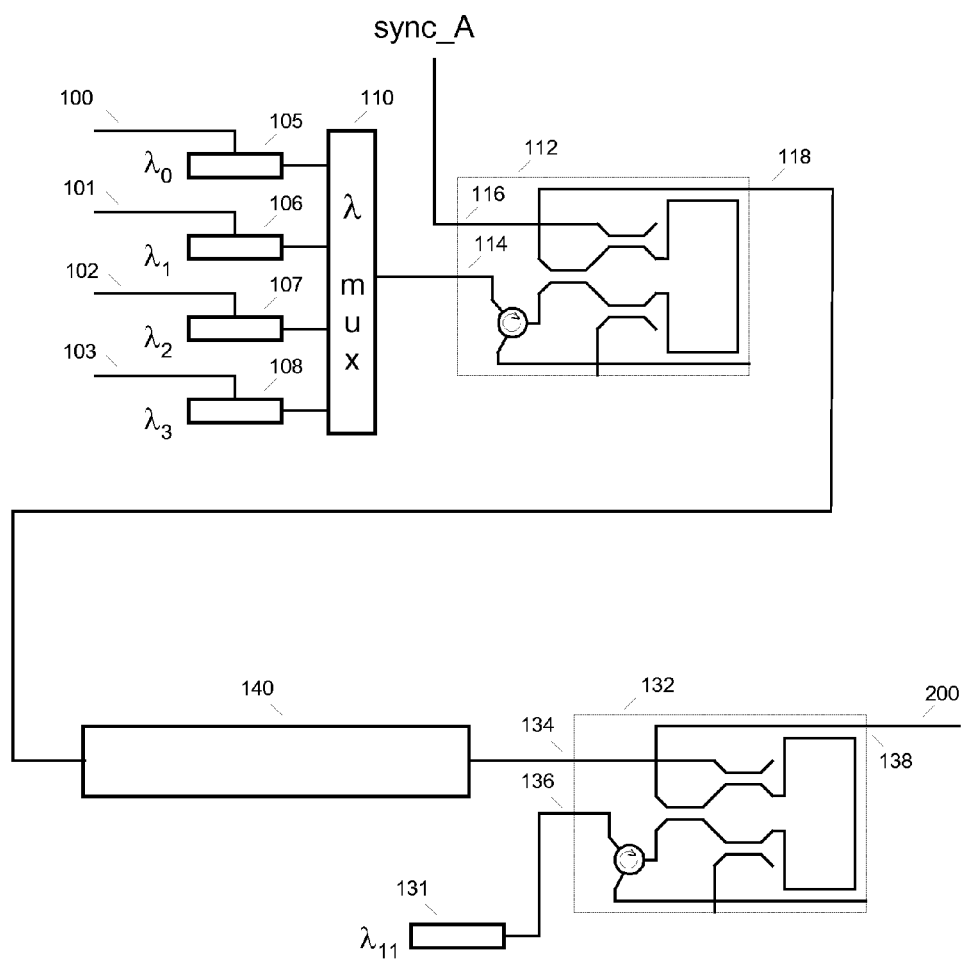
FIG. 35 shows a version of the electronic-to-optical multiplexer 82 in which the staggered wavelength dependent delays have been implemented with a wavelength dependent dispersion element.

Wavelength demultiplexer 120, delay loops 122-127, and wavelength multiplexer 130 in the electronic-to-optical multiplexers 80 and 82 shown in FIG. 4 and FIG. 21 can be replaced with a wavelength dependent dispersive optical element 140 as shown in FIG. 34 and FIG. 35, such as dispersion compensation fiber or a fiber Bragg grating, with either a positive or negative dispersion coefficient; however the wavelengths of lasers 105-108 and the dispersion have to be selected to prevent the inputs sampled by Sagnac switch 112 from temporally overlapping as shown in FIG. 11. In more detail, the wavelengths of lasers 105, 106, 107, and 108 can be in any order; however the wavelengths must be equally spaced and the spacing between the wavelengths in conjunction with the dispersion of the optical element must produce a temporal shift equivalent to a bit period clock_A__period.

Figure 36:
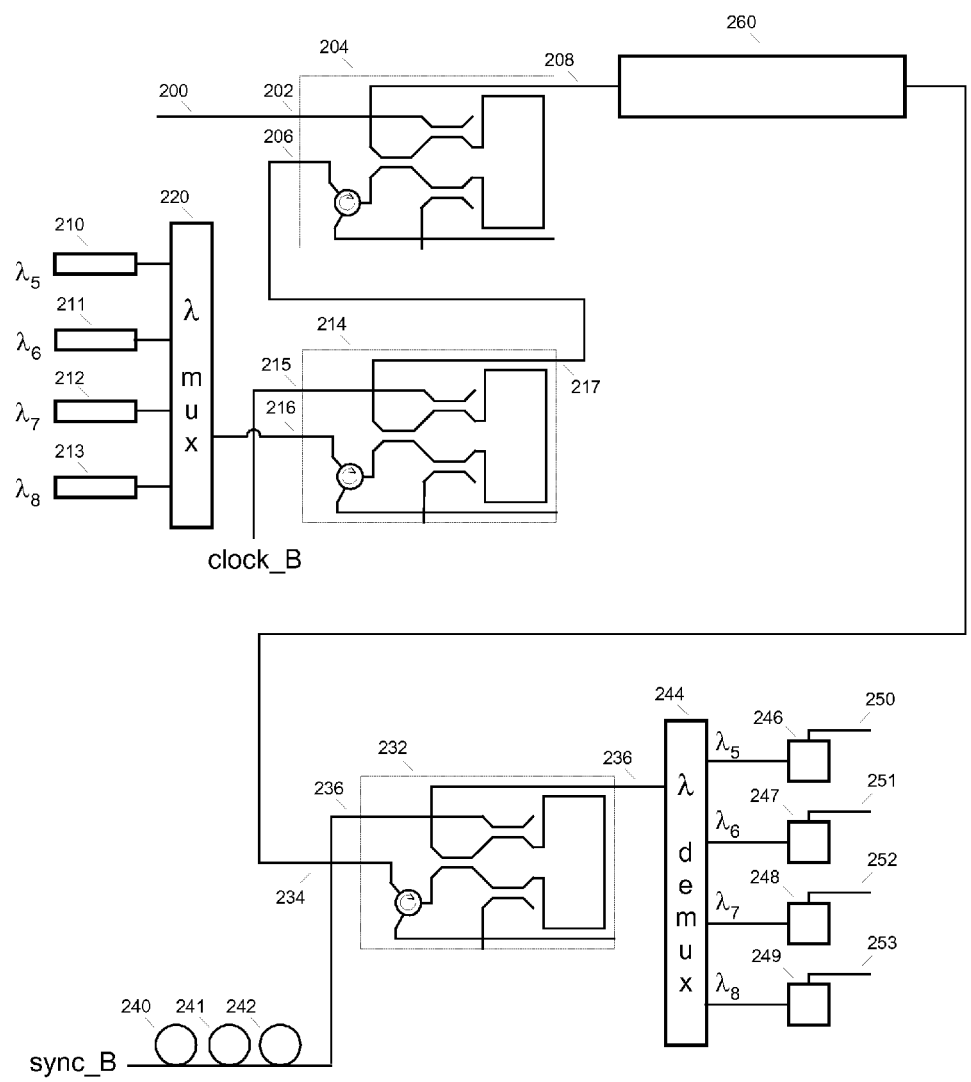
FIG. 36 shows a version of the optical-to-electronic demultiplexer 85 in which the staggered wavelength dependent delays have been implement with a wavelength dependent dispersion element.
Figure 37:
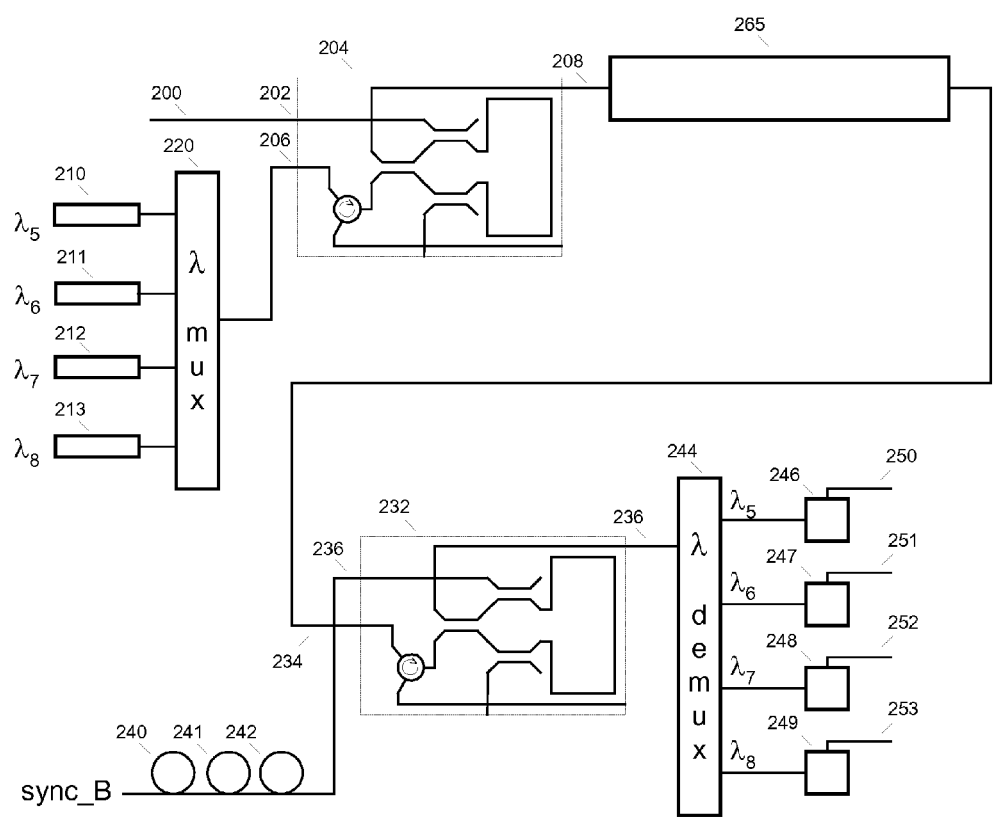
FIG. 37 shows a version of the optical-to-electronic demultiplexer 90 in which the staggered wavelength dependent delays have been implement with a wavelength dependent dispersion element.

Wavelength demultiplexer 222, delay loops 224-229, and wavelength multiplexer 230 in the optical-to-electronic demultiplexer 85 and 90 as shown in FIG. 3 and FIG. 28 can be replaced with a wavelength dependent dispersive optical element 260 in FIG. 36 and wavelength dependent dispersive optical element 265 in FIG. 37; however they must have the have the opposite dispersion as the wavelength dependent dispersive optical element used in the electronic-to-optical multiplexer and lasers 210-213 must have the same wavelength spacing as lasers 105-108.

Figure 33:
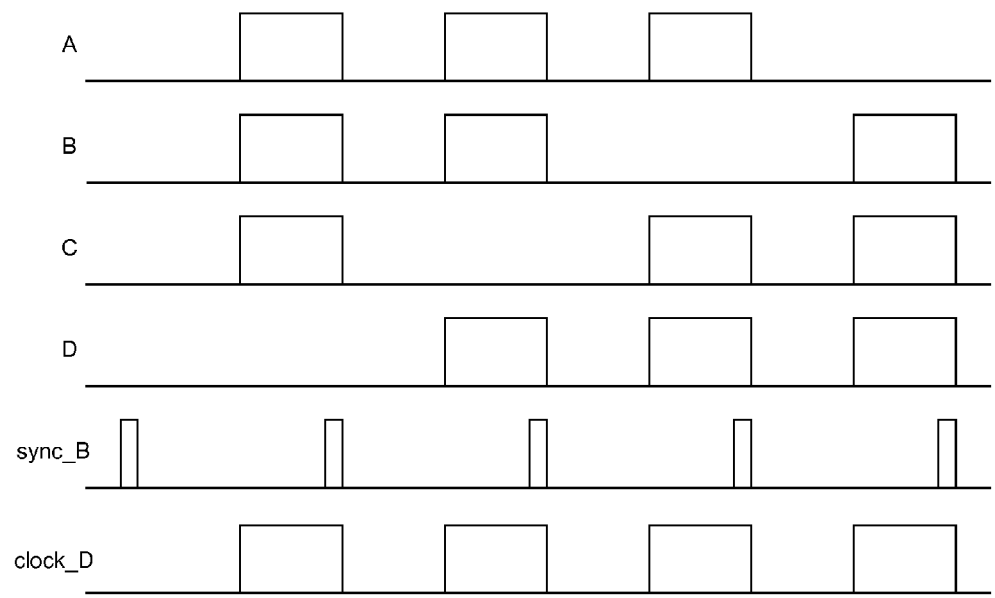
FIG. 33 shows the sampled signals shown in FIG. 32 detected and converted into electronic return-to-zero signals.

The inputs in FIG. 8 and FIG. 22 are shown as return-to-zero (RZ) signals; however non-return-to-zero (NRZ) signals can also be used. The outputs in FIG. 19 and FIG. 33 are shown as return-to-zero (RZ) signals; however non-return-to-zero (NRZ) signals can also be used.

The clock_A, clock_B, sync_A, and sync_B signals can be generated locally, generated remotely, or generated from a received signal.

The sync_B signal is delayed by (n−1)*p before it is used. The sync_B signal can be delayed by any m*p where m is an integer equal to or greater than zero and not equal to n−1 if it is not important for the outputs 250-153 to be sampled by the same sync_A pulse.

While no temporal phase difference between clock_A and clock_B are shown; the temporal window of Sagnac switch 204 can be expanded as discussed in the cited references to accommodate a temporal window as wide as clock_A_period-clock_A_pulsewidth. While no temporal phase difference between sync_A and sync_B is shown; the temporal window of Sagnac switch 232 can be expanded as discussed in the cited references to accommodate a temporal window as wide as sync_A_period-sync_A_pulsewidth.

While the signal transmitted between the electronic-to-optical multiplexer 80 or 82 and the optical-to-electronic demultiplexers 85 or 90 as shown in FIG. 14 is distorted by temporal dispersion; signals distorted by polarization dispersion and nonlinear effects can also be handled by Sagnac switch 204.

The period of the electronic-to-optical multiplexer output signal can be decreased by modifying the period of clock_A and sync_A; however the shorter period increased the intersymbol interference for a given link dispersion and this decreases the signal-to-noise ratio and this decreases the data carrying capacity of the link.

The pulse width of the electronic-to-optical multiplexer output signal can be decreased by decreasing the pulse width of either the sync_A or clock_A signal; however decreasing the pulse width increases the bandwidth of each of the multiplexed channels. This increases the crosstalk between the channels as they are wavelength multiplexed and demultiplexed; decreases the signal-to-noise of the channels; and decreases the data carrying capacity of the channels.

The clock rate of clock_C and clock_D are limited to electronic rates and bandwidths; however the clock rate of clock_A, clock_B, sync_A, and sync_B are only limited to optical rates and bandwidths.

Although the present invention has been described above in terms of specific embodiments, it is anticipated that alteration and modifications thereof will no doubt become apparent to those skilled in the art. It is therefore intended that the following claims be interpreted as covering all such alterations and modifications as falling within the true spirit and scope of the invention.

I claim:

1. An electronic-to-optical multiplexer with n electronic inputs, an optical multiplexer frame sync signal, and an optical output comprising:

n electronic-to-optical converters each with an input an output
where the inputs are connected to the electronic inputs of the electronic-to-optical multiplexer and
where each output has a different wavelength;

a wavelength multiplexer with n inputs and one output
where the inputs are connected to the outputs of the electronic-to-optical converters;

a first optical switch with a broadband input, a control input, and an output
where the broadband input is connected to the output of the wavelength multiplexer and
where the control input is connected to the optical multiplexer frame sync signal;

a delay means with an input and an output
where the delay is wavelength dependent and
where the input is connected to the output of the first optical switch;

a single wavelength optical source; and a second optical switch with an broadband input, a control input, and an output
where the broadband input is connected to the output of the single wavelength optical source,
where the control input is connected to the output of the delay means, and
where the output is connected to the optical output of the electronic-to-optical multiplexer;

whereby the electronic-to-optical converters convert the n electronic input signals into n optical signals;

the wavelength multiplexer combines the different wavelength optical signals;

the first optical switch samples the optical signals by gating the optical signals with the optical multiplexer frame sync signal;

the delay means temporally interlace the optical signals by staggering the different wavelength optical signals;

the second optical switch converts the wavelength of the wavelength multiplexed, sampled, temporally interlaced, optical signals by using the optical signal to gate the single wavelength optical source signal; and the gated single wavelength optical source signal is used as the output of the electronic-to-optical converter.

2. The electronic-to-optical multiplexer of claim 1 wherein said optical switches are polarization based Sagnac switches.

3. The electronic-to-optical multiplexer of claim 1 wherein said optical switches are wavelength based Sagnac switches.

4. The electronic-to-optical multiplexer of claim 1 wherein said wavelength multiplexer is an arrayed waveguide grating wavelength multiplexer.

5. The electronic-to-optical multiplexer of claim 1 wherein said delay means is comprised of
a wavelength demultiplexer with one input and n outputs
where the input is connected to the input of the delay means;
n optical delays each with an input and an output
where the inputs optical delays are connected to the outputs of the wavelength demultiplexer; and
a wavelength multiplexer with n inputs and one output
where the inputs are connected to the outputs of the optical delays and
where the output is connected to the output of the delay means.

6. The electronic-to-optical multiplexer of claim 1 wherein said electronic-to-optical converter is comprised of
a laser with an output;
an optical modulator with an optical input, electronic control input, and optical output
where the optical input is connected to the output of the laser,
where the electronic control input is connected to the input of the electronic-to-optical converter, and
where the output is connected to the output of the electronic-to-optical converter.

7. The electronic-to-optical multiplexer of claim 1 wherein said delay means is a wavelength dependent temporally dispersive optical element.

8. The electronic-to-optical multiplexer of claim 1 wherein said single wavelength optical source is clocked whereby the second optical switch converts and re-times the wavelength of the wavelength multiplexed, sampled, temporally interlaced, optical signals by using the optical signal to gate the clocked single wavelength optical source signal.

9. The electronic-to-optical multiplexer of claim 1 wherein said wherein
said delay means is comprised of
a wavelength demultiplexer with one input and n outputs
where the input is connected to the input of the delay means;
n optical delays $D_i$ each with an input and an output where i=0 to n−1,
where the input of optical delays $D_i$ are connected to one of the outputs of the wavelength demultiplexer, and
where delay $D_i$ is i bit periods of delay; and
a wavelength multiplexer with n inputs and one output
where the inputs are connected to the outputs of the optical delays and
where the output is connected to the output of the delay means.

10. An optical-to-electronic demultiplexer with an optical input, an optical multiplexer frame sync signal, and n electronic outputs
comprising:
a multiple wavelength optical source;
a first optical switch with a broadband input, a control input, and an output
where the control input is connected to the optical input of the optical-to-electronic demultiplexer and
where the broadband input is connected to the output of the multiple wavelength optical source;
a first delay means with an input and an output
where the delay is wavelength dependent and
where the input is connected to the output of the first optical switch;
a second delay means with an input and an output
where the input is connected to the optical multiplex frame signal;
a second optical switch with a broadband input, a control input, and an output
where the broadband input is connected to the output of the delay means and
where the control input is connected to the output of the second delay means;
a wavelength demultiplexer with an input and n outputs
where the input is connected to the output of the second optical switch; and
n detectors each with an optical input and an electronic output
where the inputs are connected to the outputs of the wavelength demultiplexer and
where the outputs are connected to the electronic outputs of the optical-to-electronic demultiplexer;
whereby
the multiple wavelength optical source generates n different wavelength optical signals;
the first optical switch creates n different wavelength copies of the input of the optical-to-electronic multiplexer by gating the different wavelength optical signals with the input of the optical-to-electronic demultiplexer;
the first delay means temporally interlaces the copies of the input by staggering the different wavelength optical signals,
the second optical switch samples the staggered optical signals by gating the staggered optical signals with a delayed optical multiplex frame sync signal;
the wavelength demultiplexer separates the gated, different wavelength, optical signals;
the detectors convert the input gated, staggered, sync gated, wavelength separated, optical signals into electronic signals; and
the electronic signals are used as the electronic outputs of the optical-to-electronic demultiplexer.

11. The optical-to-electronic demultiplexer of claim 10 wherein said optical switches are polarization based Sagnac switches.

12. The optical-to-electronic demultiplexer of claim 10 wherein said optical switches are wavelength based Sagnac switches.

13. The optical-to-electronic demultiplexer of claim 10 wherein said wavelength demultiplexer is an arrayed waveguide grating wavelength demultiplexer.

14. The optical-to-electronic demultiplexer of claim 10 wherein said delay means is comprised of
a wavelength demultiplexer with one input and n outputs
where the input is connected to the input of the delay means;
n optical delays each with an input and an output
where the inputs optical delays are connected to the outputs of the wavelength demultiplexer; and
a wavelength multiplexer with n inputs and one output where the inputs are connected to the outputs of the optical delays and
where the output is connected to the output of the delay means.

15. The optical-to-electronic demultiplexer of claim 10 wherein said delay means is a wavelength dependent temporally dispersive optical element.

16. The optical-to-electronic demultiplexer of claim 10 wherein said multiple wavelength optical source is clocked whereby the first optical switch creates n different wavelength clocked copies of the input of the optical-to-electronic multiplexer by gating the different wavelength clocked optical signals with the input of the optical-to-electronic demultiplexer.

17. The optical-to-electronic demultiplexer of claim 10 wherein said second delay means is (n−1) bit periods of delay.

18. The optical-to-electronic demultiplexer of claim 10 wherein said delay means is comprised of
a wavelength demultiplexer with one input and n outputs
where the input is connected to the input of the delay means;
n optical delays $DD_i$ each with an input and an output where i=0 to n−1,
where the input of optical delay $DD_i$ is connected to one of the outputs of the wavelength demultipler, and
where delay $DD_i$ is (n−1)−i bit periods of delay; and
a wavelength multiplexer with n inputs and one output
where the inputs are connected to the outputs of the optical delays and
where the output is connected to the output of the delay means.

19. The optical-to-electronic demultiplexer of claim 10 wherein said a multiple wavelength optical source is comprised of
n optical sources each with an output
where each source has a different wavelength;
a wavelength multiplexer with n inputs and an output
where each input is connected to one of the optical source outputs;
an optical clock with an output; and
a third optical switch with an broadband input, a control input, and an output
where the broadband input is connected to the output of the wavelength multiplexer,
where the control input is connected to the output of the optical clock, and
where the output is connected to the output of the multiple wavelength optical source;
whereby
the multiple wavelength optical source is clocked and
the first optical switch creates n different wavelength clocked copies of the input of the optical-to-electronic multiplexer by gating the different wavelength clocked optical signals with the input of the optical-to-electronic demultiplexer.

20. An ultrafast optical communications system with n electronic inputs, an optical multiplexer frame sync signal, an optical fiber link with an input and an output, and n electronic outputs
comprising:
an electronic-to-optical multiplexer comprising:
n electronic-to-optical converters each with an input an output
where the inputs are connected to the electronic inputs of ultrafast optical communications system and
where each output has a different wavelength;
a wavelength multiplexer with n inputs and one output
where the inputs are connected to the outputs of the electronic-to-optical converters;
a first optical switch with a broadband input, a control input, and an output
where the broadband input is connected to the output of the wavelength multiplexer and where the control input is connected to the optical multiplexer frame sync signal;
a delay means with an input and an output
where the delay is wavelength dependent and
where the input is connected to the output of the first optical switch;
a single wavelength optical source; and
a second optical switch with an broadband input, a control input, and an output
where the broadband input is connected to the output of the single wavelength optical source,
where the control input is connected to the output of the delay means, and
where the output is connected to the input of the optical link; and
an optical-to-electronic demultiplexer comprising:
a multiple wavelength optical source;
a first optical switch with a broadband input, a control input, and an output
where the control input is connected to the output of the optical link and
where the broadband input is connected to the output of the multiple wavelength optical source;
a first delay means with an input and an output
where the delay is wavelength dependent and
where the input is connected to the output of the first optical switch;
a second delay means with an input and an output
where the input is connected to the optical frame signal;
a second optical switch with a broadband input, a control input, and an output
where the broadband input is connected to the output of the delay means and
where the control input is connected to the output of the second delay means;
a wavelength demultiplexer with an input and n outputs
where the input is connected to the output of the second optical switch; and
n detectors each with an optical input and an electronic output
where the inputs are connected to the outputs of the wavelength demultiplexer and
where the outputs are connected to the electronic outputs of the ultrafast optical communications system.

* * * * *